United States Patent [19]
Shikai et al.

[11] Patent Number: 5,426,296
[45] Date of Patent: Jun. 20, 1995

[54] IRREGULAR PATTERN INPUT DEVICE COMPRISING AN OPTICAL FIBER BUNDLE

[75] Inventors: Masahiro Shikai; Hajime Nakajima; Kazuo Takashima, all of Hyogo, Japan

[73] Assignee: Mitsubishi Denki Kabushiki Kaisha, Toyko, Japan

[21] Appl. No.: 190,786

[22] Filed: Feb. 1, 1994

[30] Foreign Application Priority Data

Feb. 17, 1993 [JP] Japan .................. 5-049945
Jun. 24, 1993 [JP] Japan .................. 5-153513

[51] Int. Cl.⁶ .................. G02B 5/00; G06K 5/00
[52] U.S. Cl. .................. 250/227.20; 356/71; 250/556
[58] Field of Search .................. 250/227.28, 227.29, 250/227.20, 227.24, 227.11, 556; 356/71, 73; 382/4, 5, 2

[56] References Cited

U.S. PATENT DOCUMENTS

| | | | |
|---|---|---|---|
| 3,906,520 | 9/1975 | Phillips | 354/62 |
| 4,785,171 | 11/1988 | Dowling et al. | 250/227.28 |
| 4,905,293 | 2/1990 | Asai et al. | 356/71 |
| 4,932,776 | 6/1990 | Dowling et al. | 356/71 |
| 5,088,817 | 2/1992 | Igaki et al. | 250/556 |
| 5,096,290 | 3/1992 | Ohta et al. | 356/71 |
| 5,146,102 | 9/1992 | Higuchi et al. | 250/556 |
| 5,210,588 | 5/1993 | Lee | 382/4 |

FOREIGN PATENT DOCUMENTS

55-13446 1/1980 Japan .

*Primary Examiner*—David C. Nelms
*Assistant Examiner*—John R. Lee
*Attorney, Agent, or Firm*—Wolf, Greenfield & Sacks

[57] ABSTRACT

An irregular pattern input device includes an optical fiber bundle in which an entrance surface and an exit surface are respectively formed at both ends thereof. Lighting means emits irradiation light so as to provide a light pattern according to a convex portion of a subject in contact with the entrance surface, and according to a concave portion of the subject in no contact with the entrance surface. In this case, an angle of incidence of the irradiation light is set to be larger than a critical angle on an interface between a core portion of each optical fiber of the optical fiber bundle and the air. It is thereby possible to provide total reflection on the entrance surface in no contact with the concave portion of the subject, and non-total reflection on the entrance surface in contact with the convex portion of the subject, resulting in reflected light having a light pattern according to an irregular pattern. The resultant light pattern is inputted into photoelectric transforming means through the exit surface, and is transformed into electric information by the photoelectric transforming means.

25 Claims, 18 Drawing Sheets

IRREGULAR PATTERN INPUT DEVICE COMPRISING AN OPTICAL FIBER BUNDLE

BACKGROUND OF THE INVENTION

1. Field of the Invention

The present invention relates to an irregular pattern input device used for directly inputting an irregular pattern formed on a surface of a flexible material such as a rubber stamp, or a fingerprint into processors or the like.

2. Description of the Prior Art

FIG. 1 shows a conventional irregular pattern input device disclosed in, for example, Japanese Patent Application Laid-Open No. 55-13446. In FIG. 1, reference numeral 1501 means a parallel luminous flux emitted from a light source, and 1502 is a rectangular prism. The rectangular prism 1502 is provided with an entrance surface 1502a and an exit surface 1502b, and the entrance surface 1502a and the exit surface 1502b are disposed at right angle to each other. Further, reference numeral 1503 means a camera, 1504 means a processor, and 1505 is a subject.

A description will now be given of the operation. The parallel luminous flux 1501 emitted from the light source enters the entrance surface 1502a of the rectangular prism 1502. In this case, the parallel luminous flux 1501 enters perpendicular to the entrance surface 1502a. Further, the subject such as a finger 1505 closely contacts an inclined surface 1502c interposed between the entrance surface 1502a and the exit surface 1502b. In this case, a tilt angle of the inclined surface 1502c with respect to the parallel luminous flux 1501 is adjusted to be no less than a critical angle. Thus, the parallel luminous flux 1501 entering the entrance surface 1502a is totally reflected from a portion of the inclined surface 1502c in no close contact with the finger 1505, and is not totally reflected from a portion of the inclined surface 1502c in close contact with the finger 1505. Thereby, a stripe pattern is generated according to irregularity of the fingerprint formed on the finger 1505. Subsequently, the stripe pattern is inputted into the processor 1504 through the camera 1503.

Since the conventional irregular pattern input device is provided as set forth above, the parallel luminous flux 1501 emitted from the light source is disposed substantially perpendicular to an optical axis of the camera 1503. As a result, there are several problems such as difficulty of downsizing the irregular pattern input device due to restriction on an optical path.

SUMMARY OF THE INVENTION

In view of the foregoing, it is an object of the present invention to provide an irregular pattern input device which can have a compact construction by reducing restriction on an optical path.

According to the first aspect of the present invention, for achieving the above-mentioned objects, there is provided an irregular pattern input device including an optical fiber bundle formed by bundling a plurality of optical fibers to have an entrance surface and an exit surface formed at both ends of the bundled optical fibers, lighting means for emitting irradiation light to the entrance surface so as to provide a light pattern having each different amount of reflected light at the entrance surface in contact with a convex portion of a subject and at the entrance surface in no contact with a concave portion of the subject, and photoelectric transforming means, into which the obtained light pattern is inputted through the exit surface of the optical fiber bundle, for transforming the inputted light pattern into electric information. In the irregular pattern input device, a half mirror is provided on the side of an exit surface of an optical fiber bundle, irradiation light emitted from lighting means is reflected from the half mirror to be introduced into an entrance surface through the exit surface and the irradiation light is reflected with a light pattern having each different amount of reflected light at the entrance surface in contact with a convex portion of a subject and at the entrance surface in no contact with a concave portion of the subject to be introduced into the exit surface, and passes through the half mirror.

As stated above, in the irregular pattern input device according to the first aspect of the present invention, the irradiation light emitted from the lighting means is reflected from the half mirror provided on the side of the exit surface of the optical fiber bundle to be introduced into the entrance surface through the exit surface, and the irradiation light is reflected with the light pattern having each different amount of reflected light at the entrance surface in contact with the convex portion of the subject and at the entrance surface in no contact with the concave portion of the subject to be introduced into the exit surface, and passes through the half mirror. It is possible to provide a return optical system in which the lighting means is coaxial with optical transforming means by using the half mirror.

According to the second aspect of the present invention, there is an irregular pattern input device including an optical fiber bundle formed by bundling a plurality of optical fibers to have an entrance surface and an exit surface formed at both ends of the bundled optical fibers, lighting means for emitting irradiation light to the entrance surface so as to provide a light pattern having each different amount of reflected light at the entrance surface in contact with a convex portion of a subject and at the entrance surface in no contact with a concave portion of the subject, and photoelectric transforming means, into which the obtained light pattern is inputted through the exit surface of the optical fiber bundle, for transforming the inputted light pattern into electric information. In the irregular pattern input device, an entrance surface of an optical fiber bundle is inclined by a predetermined angle with respect to an axis, and irradiation light emitted from lighting means enters the entrance surface at an angle of incidence larger than a critical angle on an interface between an optical fiber and air so as to obtain a light pattern which is not totally reflected from the entrance surface in contact with a convex portion of a subject, and is totally reflected from the entrance surface in no contact with a concave portion of the subject. Further, the irradiation light is emitted at an angle of incidence which meets a constant relation with respect to a tilt angle of the entrance surface such that the light pattern is propagated through the optical fiber bundle to an exit surface.

As stated above, in the irregular pattern input device according to the second aspect of the present invention, the entrance surface of the optical fiber bundle is inclined by the predetermined angle with respect to the axis, irradiation light emitted from lighting means enters the entrance surface at the angle of incidence larger than the critical angle on the interface between the optical fiber and air so as to obtain the light pattern which is not totally reflected from the entrance surface in contact with the convex portion of the subject, and is totally reflected from the entrance surface in no contact with the concave portion of the subject. Further, the irradiation light is emitted at the angle of incidence which meets the constant relation with respect to the tilt angle of the entrance surface such that the non-totally reflected light and the totally reflected light are propagated through the optical fiber bundle to the exit surface. As set forth above, it is possible to enhance contrast of the light pattern introduced into photoelectric transforming means by taking advantage of a difference between the refractive indexes at the entrance surface in contact with the convex portion of the subject and at the entrance surface in no contact with the concave portion.

According to the third aspect of the present invention, there is provided an irregular pattern input device including an optical fiber bundle formed by bundling a plurality of optical fibers to have an entrance surface and an exit surface formed at both ends of the bundled optical fibers, lighting means for emitting irradiation light to the entrance surface so as to provide a light pattern having each different amount of reflected light at the entrance surface in contact with a convex portion of a subject and at the entrance surface in no contact with a concave portion of the subject, and photoelectric transforming means, into which the obtained light pattern is inputted through the exit surface of the optical fiber bundle, for transforming the inputted light pattern into electric information. In the irregular pattern input device, an entrance surface of an optical fiber bundle is inclined by a predetermined angle with respect to an axis. Further, the irregular pattern input device includes lighting means for emitting irradiation light at an angle of incidence which meets a constant relation with respect to a tilt angle of the entrance surface so as to obtain a light pattern according to irregularity of the subject by preventing light regularly reflected from the entrance surface in contact with a convex portion of a subject from being propagated to an exit surface to propagate diffuse reflection light to the exit surface, and by preventing light regularly reflected from the entrance surface in no contact with a concave portion of the subject, or light entering the entrance surface from the concave portion through air from being propagated to the exit surface.

As stated above, in the irregular pattern input device according to the third aspect of the present invention, the entrance surface of the optical fiber bundle is inclined by the predetermined angle with respect to the axis. Further, the irregular pattern input device includes the lighting means for emitting the irradiation light at the angle of incidence which meets the constant relation with respect to the tilt angle of the entrance surface so as to obtain the light pattern according to the irregularity of the subject by preventing the light regularly reflected from the entrance surface in contact with the convex portion of the subject from being propagated to the exit surface to propagate the diffuse reflection light to the exit surface, and by preventing the light regularly reflected from the entrance surface in no contact with the concave portion of the subject, or the light entering the entrance surface from the concave portion through the air from being propagated to the exit surface. As set forth above, it is possible to enhance contrast of the light pattern introduced into photoelectric transforming means by taking advantage of a difference between scattering angles of light at the entrance surface in contact with the convex portion of the subject and at the entrance surface in no contact with the concave portion.

According to the fourth aspect of the present invention, there is provided an irregular pattern input device including an optical fiber bundle formed by bundling a plurality of optical fibers to have an entrance surface and an exit surface formed at both ends of the bundled optical fibers, lighting means for emitting irradiation light to the entrance surface so as to provide a light pattern having each different amount of reflected light at the entrance surface in contact with a convex portion of a subject and at the entrance surface in no contact with a concave portion of the subject, and photoelectric transforming means, into which the obtained light pattern is inputted through the exit surface of the optical fiber bundle, for transforming the inputted light pattern into electric information. In the irregular pattern input device in which irradiation light is directly emitted to a subject without passing through an optical fiber, and an entrance surface of an optical fiber bundle is inclined by a predetermined angle with respect to an axis. Further, the irradiation light emitted from lighting means is set such that a constant relation can be satisfied between a critical angle on an interface between the optical fiber and air, and a tilt angle of the entrance surface so as to provide a light pattern according to irregularity of the subject by propagating diffused light of the irradiation light entering the entrance surface in contact with a convex portion of the subject through the convex portion thereof to an exit surface, and preventing diffused light of the irradiation light entering the entrance surface in no contact with a concave portion of the subject through the concave portion and the air from being propagated to the exit surface.

As stated above, in the irregular pattern input device according to the fourth aspect of the present invention, the irradiation light is directly emitted to the subject without passing through the optical fiber, and the entrance surface of the optical fiber bundle is inclined by the predetermined angle with respect to the axis. Further, the irradiation light emitted from the lighting means is set such that the constant relation can be satisfied between the critical angle on the interface between the optical fiber and the air, and the tilt angle of the entrance surface so as to provide the light pattern according to the irregularity of the subject by propagating the diffused light of the irradiation light entering the entrance surface in contact with the convex portion of the subject through the convex portion thereof to the exit surface, and preventing the diffused light of the irradiation light entering the entrance surface in no contact with the concave portion of the subject through the concave portion thereof and the air from being propagated to the exit surface. As set forth above, it is possible to enhance contrast of the light pattern introduced into photoelectric transforming means by removing restriction on an irradiation direction of the irradiation light, and taking advantage of a difference between scattering angles of light at the entrance surface in contact with the convex portion of the subject and at the entrance surface in no contact with the concave portion.

According to the fifth aspect of the present invention, there is provided an irregular pattern input device including an optical fiber bundle, lighting means having a light waveguide mounted on an entrance surface of the optical fiber bundle and a light source to introduce light into the light waveguide for propagating the light through the waveguide so as to emit irradiation light to a subject mounted on a waveguide path, and photoelectric transforming means. A light pattern according to a convex portion and a concave portion of the subject is provided by the lighting means, and is propagated through the optical fiber bundle to an exit surface.

As stated above, in the irregular pattern input device according to the fifth aspect of the present invention, the lighting means includes the light waveguide mounted on the entrance surface of the optical fiber bundle, and the light source to introduce the light into the light waveguide in order to propagate the light through the waveguide so as to emit the irradiation light to the subject mounted on the waveguide path. The light pattern according to the convex portion and the concave portion of the subject is provided by the lighting means, and is propagated through the optical fiber bundle to the exit surface. As set forth above, it is possible to optionally set an optical path by using the optical fiber, resulting in a compact device. Further, the light waveguide is employed as the lighting means so that there is no restriction on an irradiation direction of the irradiation light.

According to the sixth aspect of the present invention, there is provided an irregular pattern input device in which a shielding member is disposed around a subject, or around the subject and lighting means.

As stated above, in the irregular pattern input device according to the sixth aspect of the present invention, the shielding member is disposed around the subject, or around the subject and the lighting means. Therefore, it is possible to shield unnecessary light such as extraneous light, remove variation in a light pattern due to disturbance, and prevent reduction of contrast.

According to the seventh aspect of the present invention, there is provided an irregular pattern input device in which irradiation light emitted from lighting means has a wavelength in a particular range, and a filter is interposed between an entrance surface of an optical fiber bundle and photoelectric transforming means to pass only light having the wavelength in the particular range.

As stated above, in the irregular pattern input device according to the seventh aspect of the present invention, the irradiation light emitted from the lighting means has the wavelength in the particular range, and the filter is interposed between the entrance surface of the optical fiber bundle and the photoelectric transforming means to pass only the light having the wavelength in the particular range. Therefore, unnecessary light except the irradiation light never enters the photoelectric transforming means, and a light pattern is never varied so that reduction of contrast can be avoided as in the above embodiment.

According to the eighth aspect of the present invention, there is provided an irregular pattern input device in which lighting means includes equalizing means for providing a uniform intensity distribution of irradiation light on an entrance surface of an optical fiber bundle.

As stated above, in the irregular pattern input device according to the eighth aspect of the present invention, the lighting means includes the equalizing means for providing the uniform intensity distribution of the irradiation light on the entrance surface of the optical fiber bundle. Therefore, an obtained light pattern has uniform brightness, and is easy to see.

According to the ninth aspect of the present invention, there is provided an irregular pattern input device in which a material to absorb light is interposed between bundled optical fibers at least in one portion of the optical fiber bundle other than a partial optical fiber bundle through which irradiation light emitted by lighting means passes before reaching an entrance surface of the optical fiber bundle.

As stated above, in the irregular pattern input device according to the ninth aspect of the present invention, the material to absorb the light is interposed between the bundled optical fibers at least in one portion of the optical fiber bundle other than the partial optical fiber bundle through which the irradiation light emitted by the lighting means passes before reaching the entrance surface of the optical fiber bundle. Therefore, it is possible to prevent light from crossing the fiber and entering from the outside of the fiber or another portion in a particular optical fiber so as to propagate only waveguide light of the particular optical fiber through the fiber. As a result, unnecessary light never enters photoelectric transforming means, and a light pattern is not varied so that reduction of contrast can be avoided.

According to the tenth aspect of the present invention, there is provided an irregular pattern input device in which an optical fiber bundle includes a plurality of separated entrance surfaces, and one exit surface.

As stated above, in the irregular pattern input device according to the tenth aspect of the present invention, the optical fiber bundle includes the plurality of separated entrance surfaces, and one exit surface. As a result, it is possible to image a plurality of subjects by one imaging device, and reduce the number of parts.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 1:
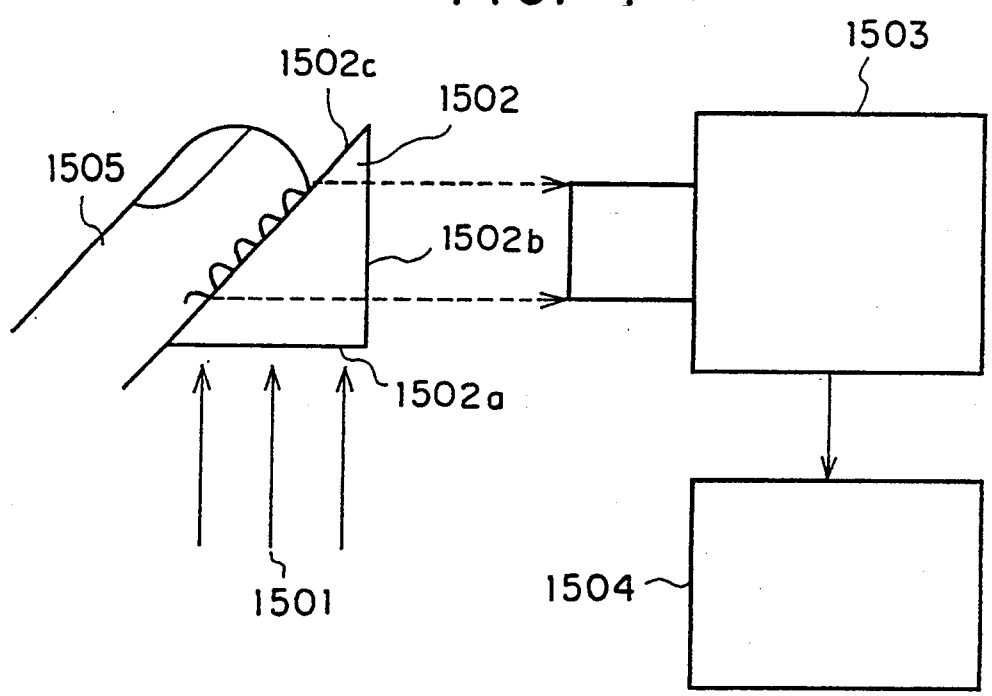
FIG. 1 is a general diagram illustrating an overall construction of a conventional irregular pattern input device.
Figure 2:
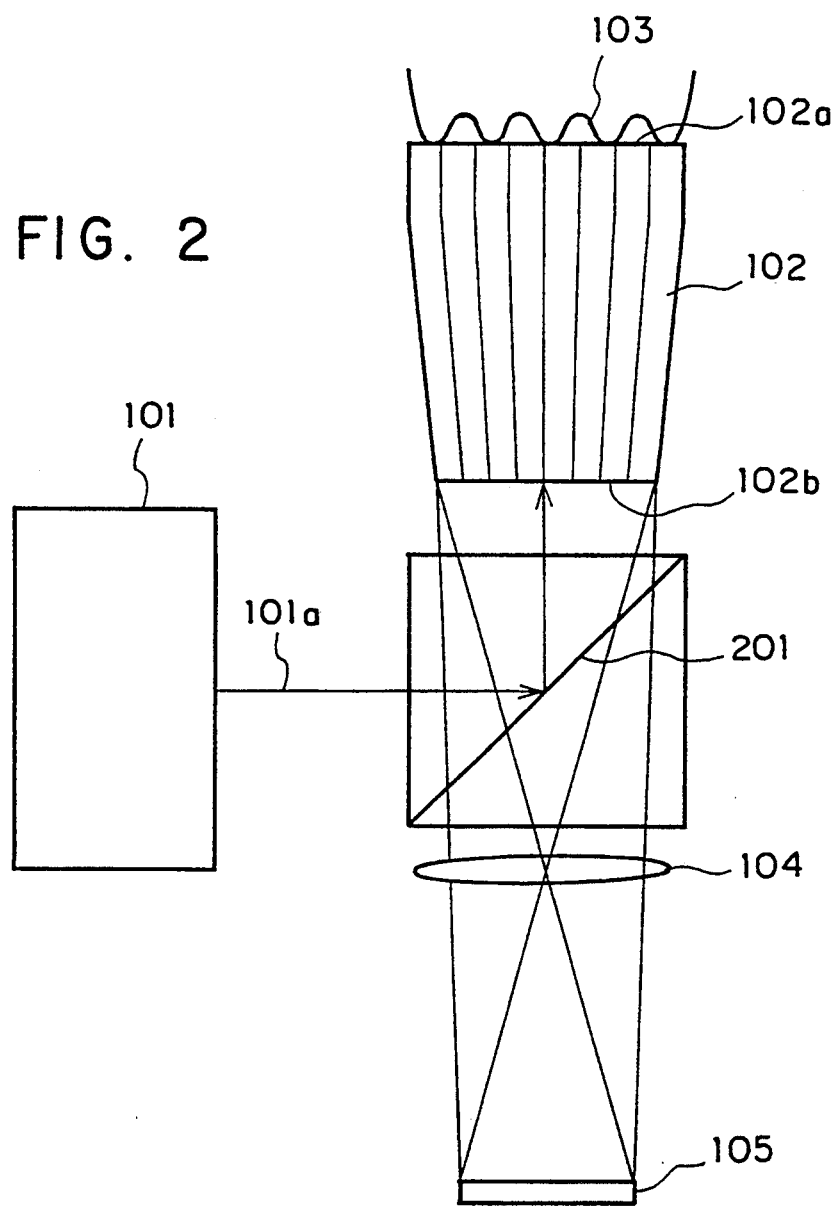
FIG. 2 is a general diagram illustrating an overall construction of an irregular pattern input device according to the embodiment 1 of the present invention.

FIG. 2 is a general diagram illustrating an overall construction the embodiment 1 of the present invention, i.e., one embodiment according to the first aspect. A description will now be given of the embodiment 1 of the present invention with reference to FIG. 2. In FIG. 2, the same reference numerals are used for component parts identical with or equivalent to those in the embodiment 1 shown in FIG. 1, and descriptions thereof are omitted. In FIG. 2, reference numeral 101 means lighting means, and a light emitting diode or the like is employed as the lighting means 101. Reference numeral 102 means an optical fiber bundle, 102a is an entrance surface of the optical fiber bundle 102, and 102b is an exit surface of the optical fiber bundle 102. Reference numeral 103 means a subject such as a finger having an irregular pattern, 104 is an image formation optical system, and 105 is an imaging device. For example, a CCD is employed as the imaging device 105. Reference numeral 201 means a half mirror mounted on the side of an exit surface of an optical fiver flux 102.

A description will now be given of the operation. First, an irregular pattern of a subject 103 closely contacts an entrance surface 102a. Subsequently, a parallel luminous flux 101a is emitted from lighting means 101. The emitted parallel luminous flux 101a is reflected from the half mirror 201 to enter an exit surface 102b. The light incident on the exit surface 102b is propagated through each optical fiber, and is reflected from the entrance surface 102a. In this case, a convex portion of the subject 103 closely contacts the entrance surface 102a, and a concave portion thereof is in no contact with the entrance surface 102a. Accordingly, there is each different reflectance at the entrance surface 102a in close contact with the convex portion of the subject 103 and at the entrance surface 102a in no contact with the concave portion of the subject 103, resulting each different amount of reflected light. Thereby, the reflected light on the entrance surface 102a forms a light pattern according to the irregular pattern of the subject 103. The reflected light having the light pattern enters each optical fiber of the optical fiber bundle 102, and is propagated through each optical fiber to be emitted from the exit surface 102b. The pattern light emitted from the exit surface 102b passes through the half mirror 201 to reach an image formation optical system 104. Thereby, the pattern light passes through the image formation optical system 104, and is imaged on an imaging surface of an imaging device 105. As set forth above, by using the half mirror, it is possible to provide a return optical system in which the lighting means is coaxial with optical transforming means, resulting in a more compact device.

Embodiment 2

Though the subject 103 directly contacts the entrance surface 102a in the embodiment 1, it must be noted that the invention should not be limited to this, and a transparent thin film may be provided on the entrance surface 102a to contact the subject 103 with the thin film.

Embodiment 3

Figure 3:
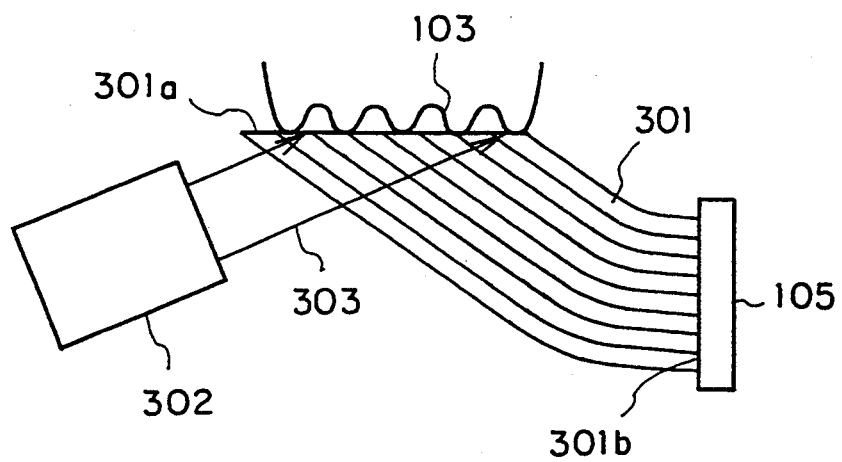
FIG. 3 is a general diagram illustrating an overall construction of an irregular pattern input device according to the embodiment 3 of the present invention.
Figure 4:
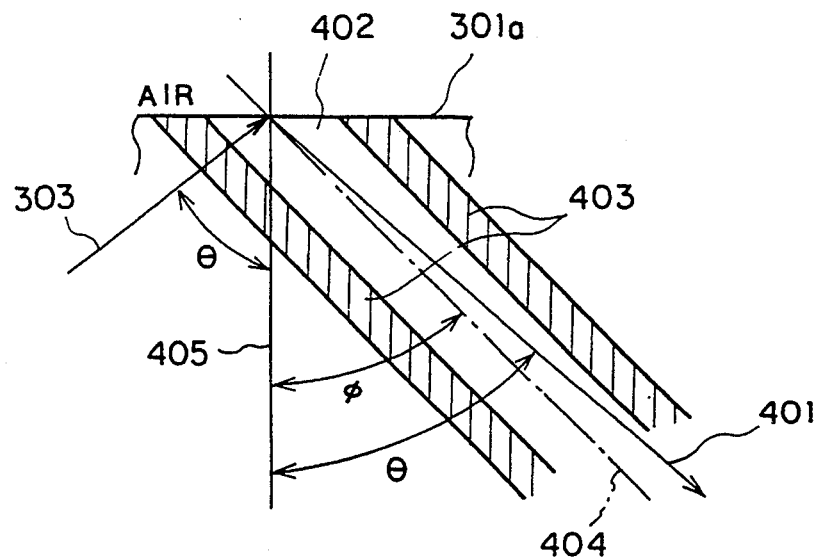
FIG. 4 is an enlarged view of an essential part according to the embodiment 3.

FIG. 3 is a general diagram illustrating an overall construction of the embodiment 3 of the present invention, i.e., one embodiment according to the second aspect, and FIG. 4 is an enlarged view of an essential part thereof. A description will now be given of the embodiment 3 with reference to FIGS. 3 and 4. In FIG. 3, the same reference numerals are used for component parts identical with or equivalent to those in the embodiment 1 shown in FIG. 2, and descriptions thereof are omitted. In FIG. 3, reference numeral 301 means an optical fiber bundle, 301a means an entrance surface of the optical fiber bundle 301, and 301b means an exit surface of the optical fiber bundle 301. The entrance surface 301a is inclined at a predetermined angle with respect to a central axis of each optical fiber of the optical fiber bundle 301. Reference numeral 302 means lighting means, and 303 means a parallel luminous flux (irradiation light) emitted from the lighting means. In FIG. 4, reference numeral 401 means regular reflection light of the parallel luminous flux 303 on the entrance surface 301a, and an angle between the regular reflection light 401 and a normal 405 of the entrance surface is set to $\theta$. Reference numeral 402 means a core portion of one optical fiber of the optical fiber bundle 301, 403 means a clad, and 404 is a central axis of the optical fiber. In the vicinity of the entrance surface 301a, an angle between the central axis 404 and the normal 405 of the entrance surface 301a is set to $\phi$.

A description will now be given of the operation. First, the parallel luminous flux 303 is emitted from the lighting means 302. The parallel luminous flux 303 passes through the optical fiber bundle 301 to reach the entrance surface 301a. In this case, it is assumed that the incident angle $\theta$ of the parallel luminous flux 303 with respect to the entrance surface 301a is greater than a critical angle on an interface between the core portion 402 of the optical fiber and air. Therefore, the reflected light 401 having the reflection angle $\theta$ is totally reflected from the entrance surface 301a in no contact with a concave portion of a subject 103, and is not totally reflected from the entrance surface 301a in contact with a convex portion of the subject 103 because of the refractive indexes of media. Thereby, the reflected light at a portion in no contact with the concave portion has higher intensity than that of the reflected light at a portion in contact with the convex portion so that the reflected light 401 can form a high contrast light pattern according to an irregular pattern. Here, the central axis 404 of the optical fiber in the vicinity of the entrance surface 301a is substantially parallel to the reflected light 401. In order to propagate the reflected light 401 through the optical fiber of the optical fiber bundle 301, the angle $\phi$ between the normal 405 of the entrance surface 301a and the central axis 404 of the optical fiber satisfies the following expression (1):

$$\theta - \sin^{-1}(N.A./n_{core}) \leq \phi \leq \theta + \sin^{-1}(N.A./n_{core}) \quad (1)$$

where $n_{core}$ is the refractive index of the core portion 402 of the optical fiber, and N.A. is the numerical aperture of the optical fiber. Thereby, the reflected light 401 having the reflection angle $\theta$ can be propagated through each optical fiber of the optical fiber bundle 301. Non-total reflection light is propagated through the optical fiber whose entrance surface 301a contacts the convex portion of the subject 103, and total reflection light is propagated through the optical fiber whose entrance surface 301a is opposed to the concave portion. Thus, a light pattern according to the irregular pattern of the subject 103 reaches the exit surface 301b. An imaging device 105 is directly attached to the exit surface 301b so that an imaging surface of the imaging device 105 directly contacts the exit surface 301b, or is disposed in the vicinity of the exit surface 301b. As a result, it is possible to directly input the light pattern on the exit surface 301b into the imaging surface of the imaging device 105. In FIG. 3, more precisely, the parallel luminous flux 303 emitted from the lighting means 302 is refracted when the parallel luminous flux 303 passes through the optical fiber bundle 301. However, this refraction causes a minor problem so that the parallel luminous flux 303 in a straight travelling condition has been discussed.

Embodiment 4

Figure 5:
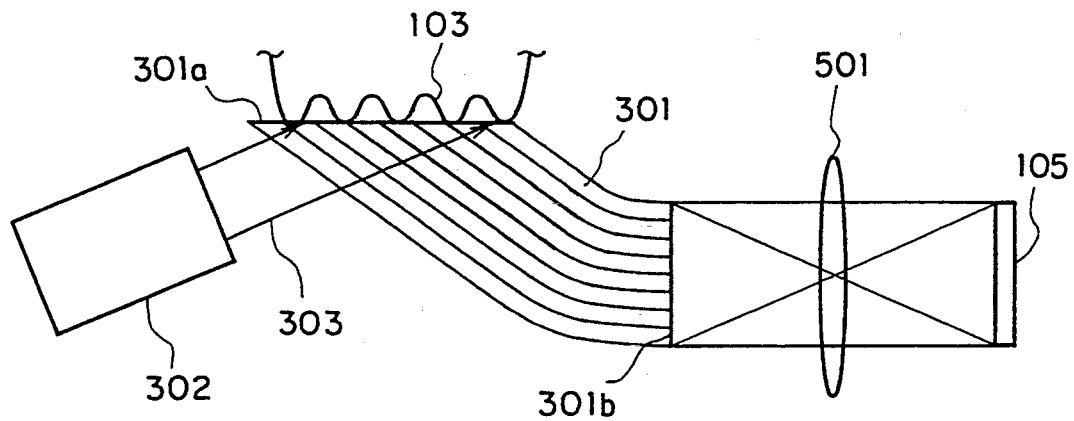
FIG. 5 is a general diagram illustrating an overall construction of an irregular pattern input device according to the embodiment 4 of the present invention.

Though the imaging device 105 is attached to the exit surface 301b in the embodiment 3, it must be noted that the invention should not be limited to this, the light pattern on the exit surface 301b may be imaged in the imaging device 105 through an image formation optical system 501 as shown in FIG. 5. In FIG. 5, the same reference numerals are used for component parts identical with or equivalent to those in the embodiment 3 shown in FIG. 3, and descriptions thereof are omitted.

Embodiment 5

Figure 6:
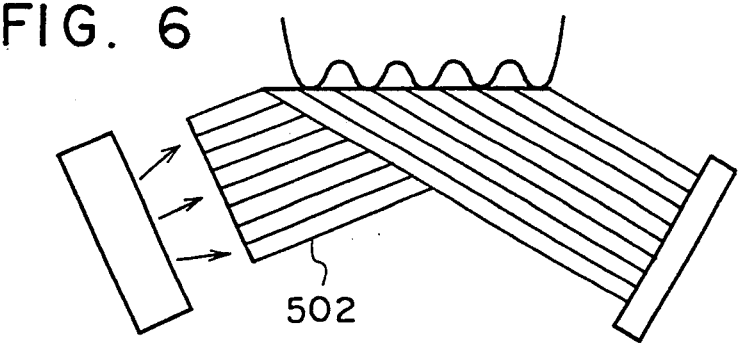
FIG. 6 is a general diagram illustrating an overall construction of an irregular pattern input device according to the embodiment 5 of the present invention.
Figure 7:
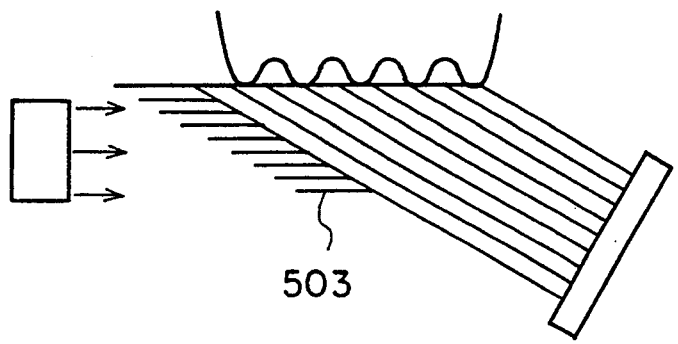
FIG. 7 is a general diagram illustrating an overall construction of the irregular pattern input device according to the embodiment 5 of the present invention.

The embodiment 3 has been described with reference to a case where the parallel luminous flux 303 is emitted by using the lighting means 302. However, the parallel luminous flux is not always necessary if the light enters at an incident angle which meets the expression (1) on the entrance surface 301a. In this case, if there is provided a fiber plate 502 as shown in FIG. 6, or an angle restricting plate 503 as shown in FIG. 7, irradiation light is hardly diffused. As a result, a predetermined angle of incidence can be more easily provided.

Embodiment 6

Figure 8:
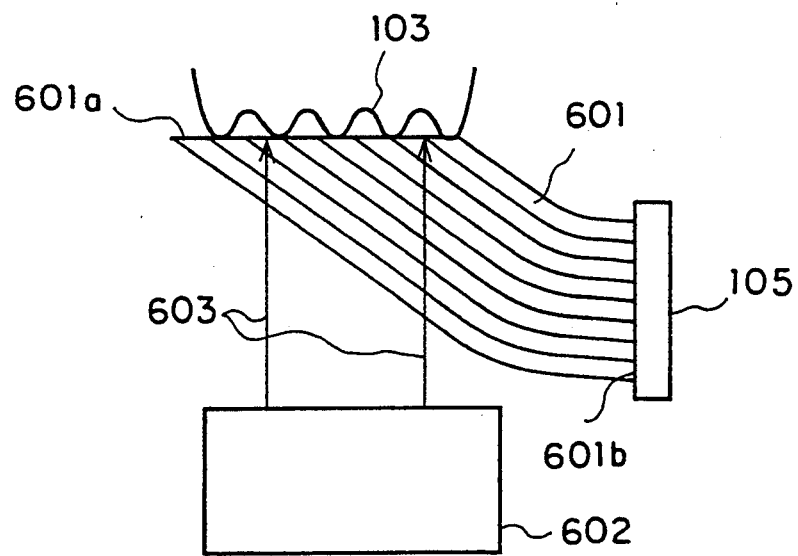
FIG. 8 is a general diagram illustrating an overall construction of an irregular pattern input device according to the embodiment 6 of the present invention.
Figure 9:
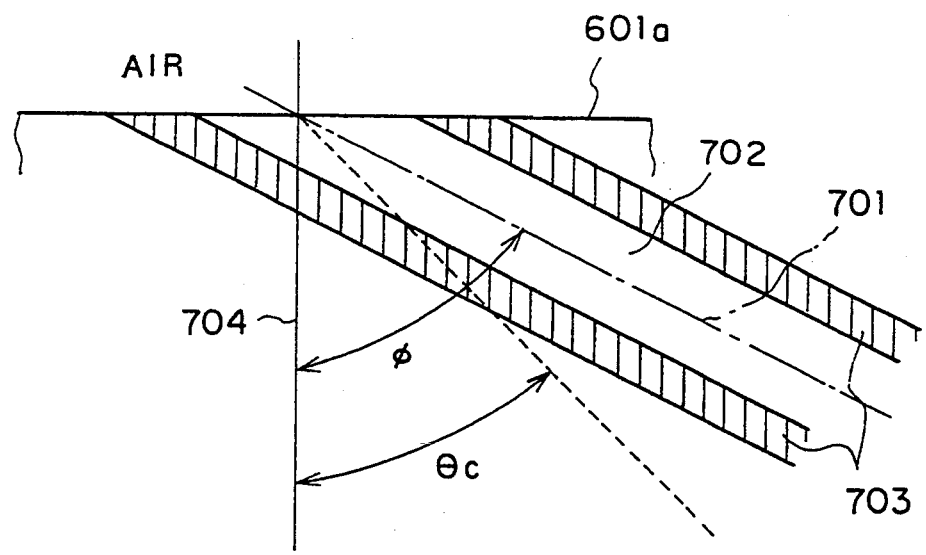
FIG. 9 is an enlarged view of an essential part according to the embodiment 6.

FIG. 8 is a general diagram illustrating an overall construction of the embodiment 6 of the present invention, i.e., one embodiment according to the third aspect, and FIG. 9 is an enlarged view of an essential part thereof. A description will now be given of the embodiment 6 with reference to FIGS. 8 and 9. In FIG. 8, the same reference numerals are used for component parts identical with or equivalent to those in the embodiment 1 shown in FIG. 2, and descriptions thereof are omitted. In FIG. 8, reference numeral 601 means an optical fiber bundle, and 601a means an entrance surface of the optical fiber bundle 601. As in the embodiment 3, the entrance surface 601a is inclined at a predetermined angle with respect to a central axis of each optical fiber of the optical fiber bundle 601. Reference numeral 602 means lighting means, and 603 means a parallel luminous flux emitted from the lighting means 602. In FIG. 9, reference numeral 701 means a central axis of one optical fiber of the optical fiber bundle 601, and the central axis 701 of the optical fiber is inclined at an angle $\phi$ with respect to a normal 704 of the entrance surface 601a in the vicinity of the entrance surface 601a. Reference numeral 702 means a core portion of the optical fiber, and 703 is a clad.

A description will now be given of the operation. First, irradiation light emitted from the lighting means 602 passes through the optical fiber bundle 601, and the entrance surface 601a is irradiated with the irradiation light. In this case, an irradiation direction of the irradiation light emitted from the lighting means 602 can be optionally set in a range in which regular reflection light of the irradiation light on the entrance surface 601a can not directly enter the optical fiber for propagation. In the entrance surface 601a, there are generated the regular reflection light and transmitted light into the air on the entrance surface 601a in no contact with a concave portion of a subject 103, and there is generated diffuse reflection light on the entrance surface 601a in contact with a convex portion of the subject 103. Since the regular reflection light from the entrance surface 601a in no contact with the concave portion of the subject 103 is set so as not to be propagated through the optical fiber, only the diffuse reflection light at the convex portion can be propagated through the optical fiber bundle 601. Therefore, it is possible to provide a light pattern according to the convex portion of the subject 103. On the other hand, diffused light passing through the entrance surface 601a in no contact with the concave portion of the subject 103 can partially pass through the air once, and can enter the optical fiber bundle 601 through the entrance surface 601a. Accordingly, it is necessary to prevent the diffuse light from being propagated through the optical fiber in order to provide a higher contrast light pattern. On the other hand, an angle between the diffuse light entering the optical fiber bundle 601 from the air through the entrance surface 601a in no contact with the concave portion of the subject 103 and the normal 704 of the entrance surface 601a is less than a critical angle $\theta_c$ on the entrance surface 601a. Consequently, it is possible to propagate only the diffuse reflection light on the entrance surface 601a in contact with the convex portion of the subject 103 through the optical fiber to the exit surface 601b by setting the angle $\phi$ between the normal 704 of the entrance surface 601a and the central axis 701 of the optical fiber to meet the following expression (2):

$$\phi > \theta_c + \sin^{-1}(N.A./n_{core}) \quad (2)$$

where $n_{core}$ is the refractive index of the core portion 702 of the optical fiber, and N.A. is the numerical aperture of the optical fiber. Since an imaging device 105 is directly attached to the exit surface 601b, an imaging surface of the imaging device 105 directly contacts the exit surface 601b, or is disposed in the vicinity of the exit surface 601b. As a result, it is possible to directly input the light pattern on the exit surface 601b into the imaging surface of the imaging device 105. In FIG. 8, more precisely, the parallel luminous flux 603 emitted from the lighting means 602 is refracted when the parallel luminous flux 603 passes through the optical fiber bundle 601. However, this refraction causes a minor problem so that the parallel luminous flux 603 in a straight travelling condition has been discussed.

Embodiment 7

Figure 10:
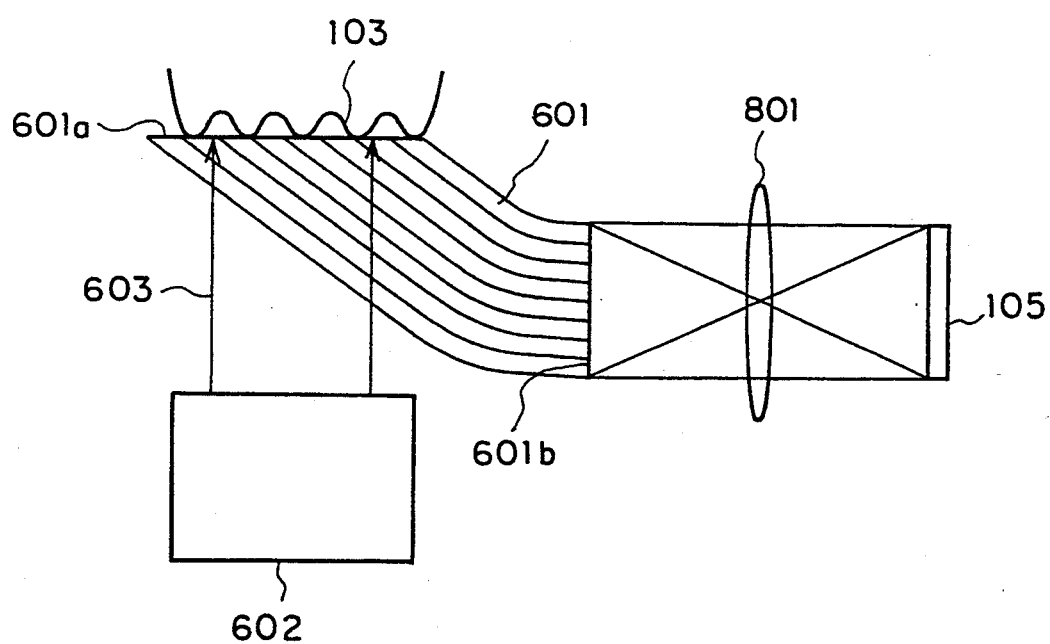
FIG. 10 is a general diagram illustrating an overall construction of an irregular pattern input device according to the embodiment 7 of the present invention.

Though the embodiment 6 has been described with reference to a case where the imaging device 105 is attached to the exit surface 601b, it must be noted that the invention should not be limited to this, and the light pattern on the exit surface 601b may be imaged in the imaging device 105 through an image formation optical system 801 as shown in FIG. 10. In FIG. 10, the same reference numerals are used for component parts identical with or equivalent to those in the embodiment 6 shown in FIG. 8, and descriptions thereof are omitted.

Embodiment 8

The embodiment 6 has been described with reference to a case where the parallel luminous flux 603 is emitted by using the lighting means 602. However, the parallel luminous flux is not always necessary if light enters at an angle of incidence which meets the expression (2) on the entrance surface 601a. In this case, diffusion of irradiation light may be avoided by restricting the angle of incidence by a fiber plate as shown in FIG. 6, or an angle restricting plate as shown in FIG. 7.

Embodiment 9

Figure 11:
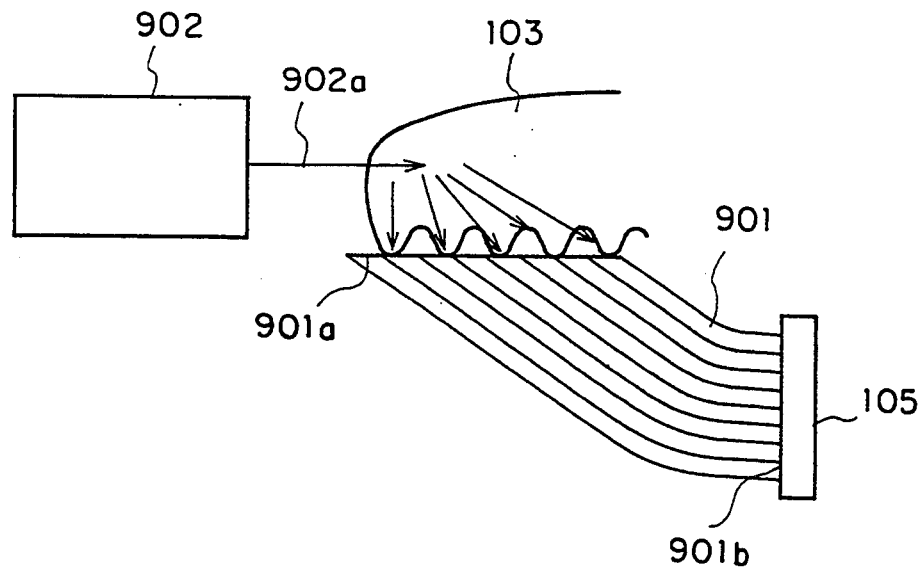
FIG. 11 is a general diagram illustrating an overall construction of an irregular pattern input device according to the embodiment 9 of the present invention.

FIG. 11 is a general diagram illustrating an overall construction of the embodiment 9 of the present invention, i.e., one embodiment according to the fourth aspect. A description will now be given of the embodiment 9 with reference to FIG. 11. In FIG. 11, the same reference numerals are used for component parts identical with or equivalent to those in the embodiment 1 shown in FIG. 2, and descriptions thereof are omitted. In FIG. 11, reference numeral 901 means an optical fiber bundle, and 901a means an entrance surface of the optical fiber bundle 601. The entrance surface 901a is inclined at a predetermined angle with respect to a central axis of each optical fiber of the optical fiber bundle 901. Further, reference numeral 901b means an exit surface of the optical fiber bundle 901, and 902 means lighting means.

A description will now be given of the operation. First, if a subject 103 is directly irradiated with light 902a emitted from the lighting means 902a without the light 902a passing through an optical fiber, the light 902a entering the subject 103 is diffused in the subject 103, resulting in transmission. Thereby, the light 902a entering the subject 103 can partially reach an irregular surface of the subject 103. Subsequently, the light reaching the entrance surface 901a in no contact with a concave portion of the subject 103 is diffused from the concave portion into the air, and the diffused light enters the entrance surface 901a. Further, the light reaching the entrance surface 901a in contact with a convex portion of the subject 103 directly enters the entrance surface 901a from the convex portion without passing through the air, and is diffused. Therefore, it is possible to provide a light pattern according to the convex portion of the subject 103 by propagating only the diffused light entering the entrance surface 901a from the convex portion of the subject 103 through the optical fiber bundle 901. That is, the diffused light from the convex portion of the subject 103 is a substantially perfectly diffused light while the diffused light entering the optical fiber bundle 901b through the concave portion of the subject 103 has an angle with respect to a normal of the entrance surface 901a which is less than a critical angle $\theta_c$ on the entrance surface 901a (see FIG. 9). Consequently, it is possible to propagate only the diffused light from the convex portion of the subject 103 through the optical fiber to the exit surface 901b by setting an angle $\phi$ between the normal of the entrance surface 901a and the central axis 701 of the optical fiber (see FIG. 9) so as to meet the expression (2) described in the embodiment 6. Since an imaging device 105 is directly attached to the exit surface 901b, an imaging surface of the imaging device 105 directly contacts the exit surface 901b, or is disposed in the vicinity of the exit surface 901b. As a result, it is possible to directly input the light pattern on the exit surface 901b into the imaging surface of the imaging device 105. As set forth above, the irradiation light is directly emitted to the subject so as to remove restriction on an irradiation direction of the irradiation light, and incline the entrance surface of the optical fiber bundle by a predetermined angle. As a result, it is possible to provide a higher contrast light pattern.

Embodiment 10

Figure 12:
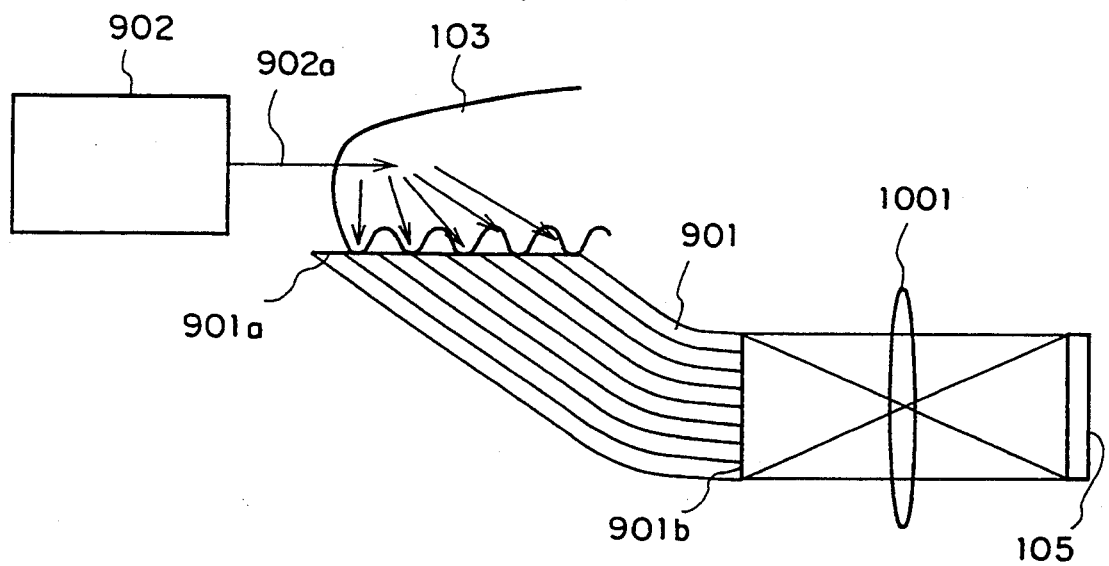
FIG. 12 is a general diagram illustrating an overall construction of an irregular pattern input device according to the embodiment 10 of the present invention.

Though the embodiment 9 has been described with reference to a case where the imaging device 105 is attached to the exit surface 901b, it must be noted that the invention should not be limited to this, and the light pattern on the exit surface 901b may be imaged in the imaging device 105 through an image formation optical device 1001 as shown in FIG. 12. In FIG. 12, the same reference numerals are used for component parts identical with or equivalent to those in the embodiment 9 shown in FIG. 11, and descriptions thereof are omitted.

Embodiment 11

Figure 13:
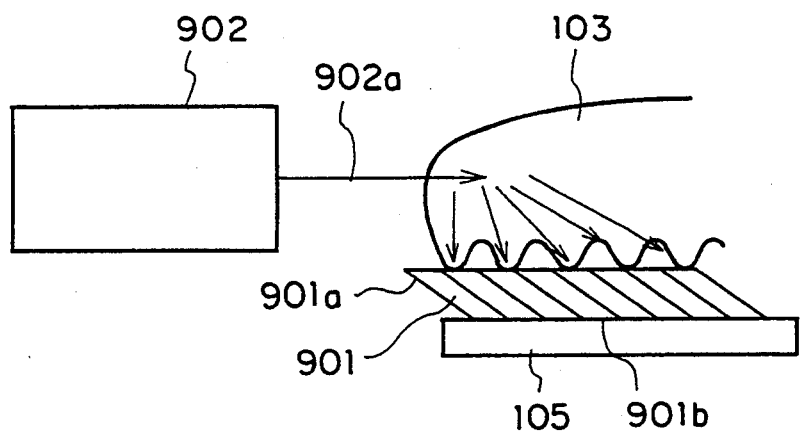
FIG. 13 is a general diagram illustrating an overall construction of an irregular pattern input device according to the embodiment 11 of the present invention.

In the embodiment 8, the optical fiber bundle may be provided in a form as shown in FIG. 13. That is, if the exit surface 901b extends parallel to the entrance surface 901a, and an essential optical fiber bundle 901 is provided, it is possible to provide a more compact device.

Embodiment 12

In the embodiment 8, the entrance surface 901a is inclined by a predetermined angle so as to provide the high contrast light pattern. However, it must be noted that the invention should not be limited to the tilt angle as described in the embodiment 8. It is possible to provide a light pattern according to irregularity by directly irradiating a subject 103, and to provide a compact device having no restriction on an irradiation direction of irradiation light. That is, the light 902a emitted from the lighting means 902 enters the subject 103, and is diffused in the subject 103 to pass through, and the light 902a can partially reach an irregular surface of the subject 103. The light reaching the entrance surface 901a in no contact with the concave portion of the subject 103 is diffused into the air from the concave portion, and the diffused light enters the entrance surface 901a. Further, the light reaching the entrance surface 901a in contact with the convex portion of the subject 103 directly enters the entrance surface 901a without passing through the air, and is diffused. An amount of the diffused light at the entrance surface in contact with the convex portion of the subject is different from that at the entrance surface in no contact with the concave portion of the subject. As a result, it is possible to provide the light pattern according to the irregularity, and to propagate the light pattern to the exit surface.

Embodiment 13

Figure 14:
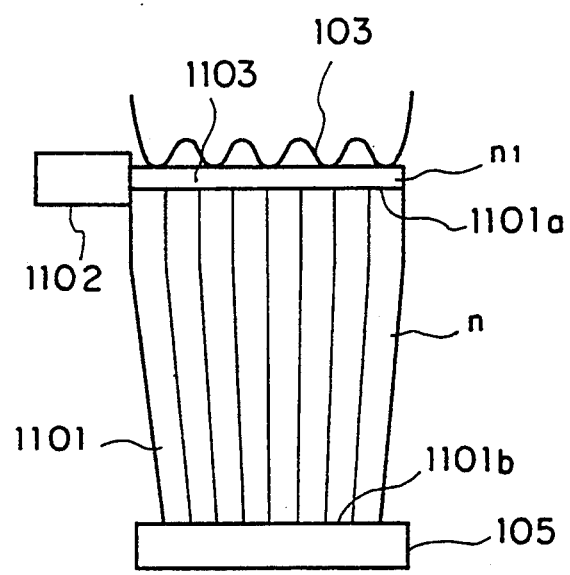
FIG. 14 is a general diagram illustrating an overall construction of an irregular pattern input device according to the embodiment 13 of the present invention.

FIG. 14 is a general diagram illustrating an overall construction of the embodiment 13 of the present invention, i.e., one embodiment according to the fifth aspect. A description will now be given of the embodiment 13 with reference to FIG. 14. In FIG. 14, the same reference numerals are used for component parts identical with or equivalent to those in the embodiment 1 shown in FIG. 2, and descriptions thereof are omitted. In FIG. 14, reference numeral 1101 means an optical fiber bundle, 1101a means an entrance surface of the optical fiber bundle 1101, 1101b is an exit surface of the optical fiber bundle 1101, and 1102 is a light source. The light source 1102 is provided to form lighting means together with a light; waveguide 1103 mounted on the entrance surface 1101a. The light waveguide 103 is formed by mounting a thin transparent body having the refractive index higher than the refractive index n of the optical fiber, for example, a glass (having the refractive index $n_1$) onto the entrance surface 1101a.

A description will now be given of the operation.

When light is emitted from the light source 1102 to the light waveguide 1103, the light is propagated through the waveguide 1103 with repetitive total reflection because of $n_1 > n$, and irradiation light is emitted to a subject 103 mounted on the waveguide 1103. The irradiation light generates a light pattern according to the convex portion and the concave portion of the subject 103, and the light pattern is propagated through the optical fiber bundle 1101 to the exit surface 1101b. The light reaching the exit surface 1101b is imaged on an imaging surface of an imaging device 105. As set forth above, it is possible to optionally set an optical path by using the optical fiber, and provide a compact device. Further, the light waveguide 1103 is provided so as to remove restriction on an irradiation direction of an irradiation light, resulting in a more compact device.

Embodiment 14

Figure 15:
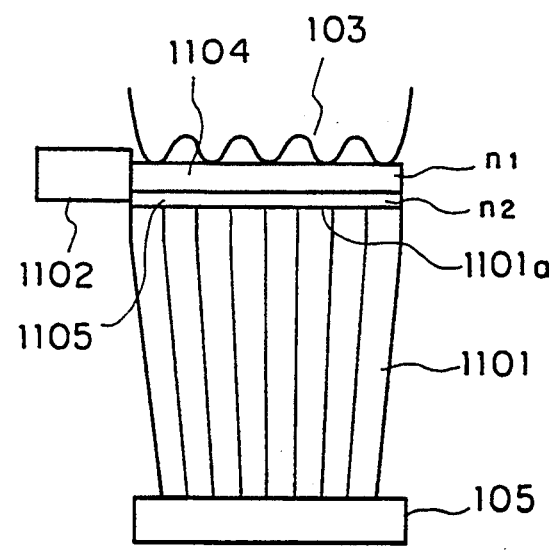
FIG. 15 is a general diagram illustrating an overall construction of an irregular pattern input device according to the embodiment 14 of the present invention.

In the embodiment 13, the light waveguide 1103 has a mono-layer structure. However, a multi-layer structure may be provided to include light waveguides 1104 and 1105 having the refractive indexes $n_1$, $n_2$ ($n_1 > n_2$) as shown in FIG. 15. It is thereby possible to propagate light from the light source 1102 through the light waveguide 1104 having large refractive index, and emit irradiation light to a subject 103.

Embodiment 15

Figure 16:
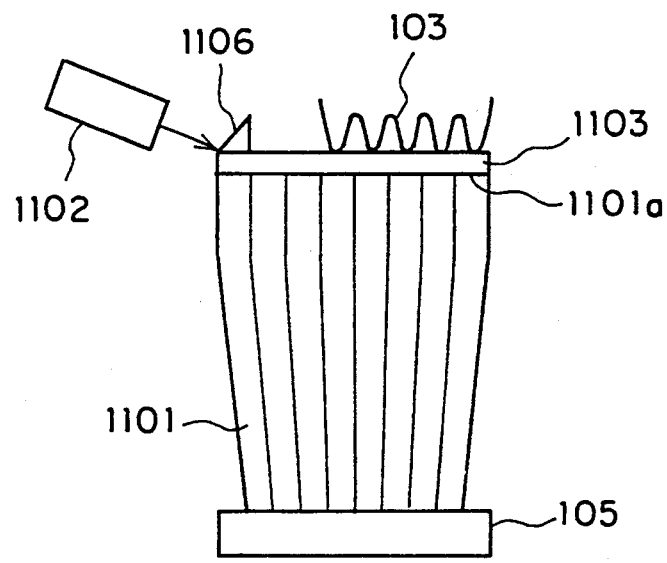
FIG. 16 is a general diagram illustrating an overall construction of an irregular pattern input device according to the embodiment 15 of the present invention.

Further, in the embodiment 13, light from the light source 1102 may be introduced into a light waveguide 1103 through a prism 1106 as shown in FIG. 16.

Embodiment 16

Figure 17:
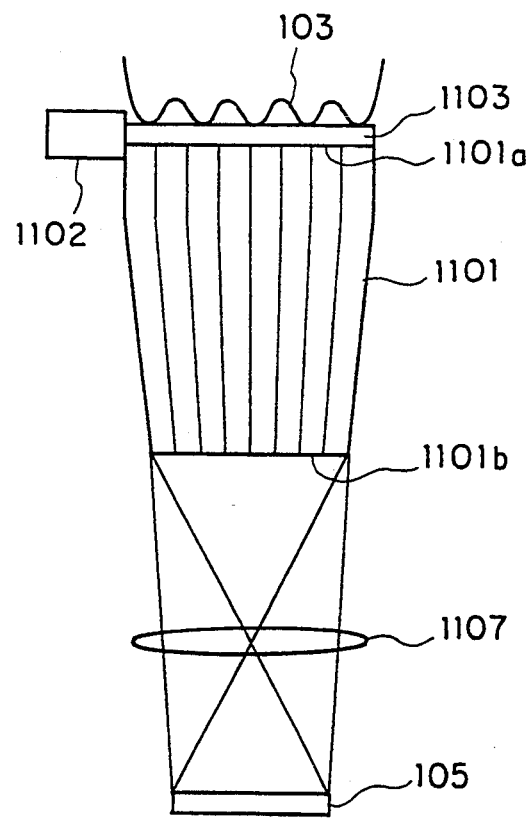
FIG. 17 is a general diagram illustrating an overall construction of an irregular pattern input device according to the embodiment 16 of the present invention.

Though the embodiment 13 has been described with reference to a case where the imaging device 105 is attached to the exit surface 1101b, it must be noted that the invention should not be limited to this, and the light pattern on the exit surface 1101b may be imaged in the imaging device 105 through an image formation optical system 1107 as shown in FIG. 17. In FIG. 17, the same reference numerals are used for component parts identical with or equivalent to those in the embodiment 13 shown in FIG. 14, and descriptions thereof are omitted.

Embodiment 17

Figure 18:
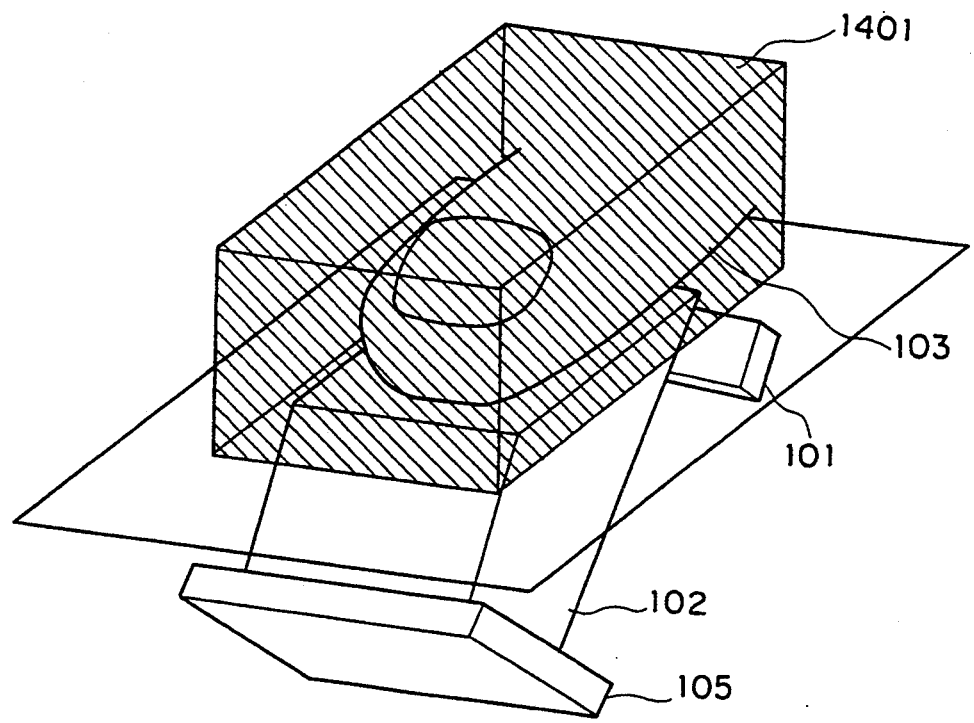
FIG. 18 is a perspective view illustrating an irregular pattern input device according to the embodiment 17 of the present invention.
Figure 19:
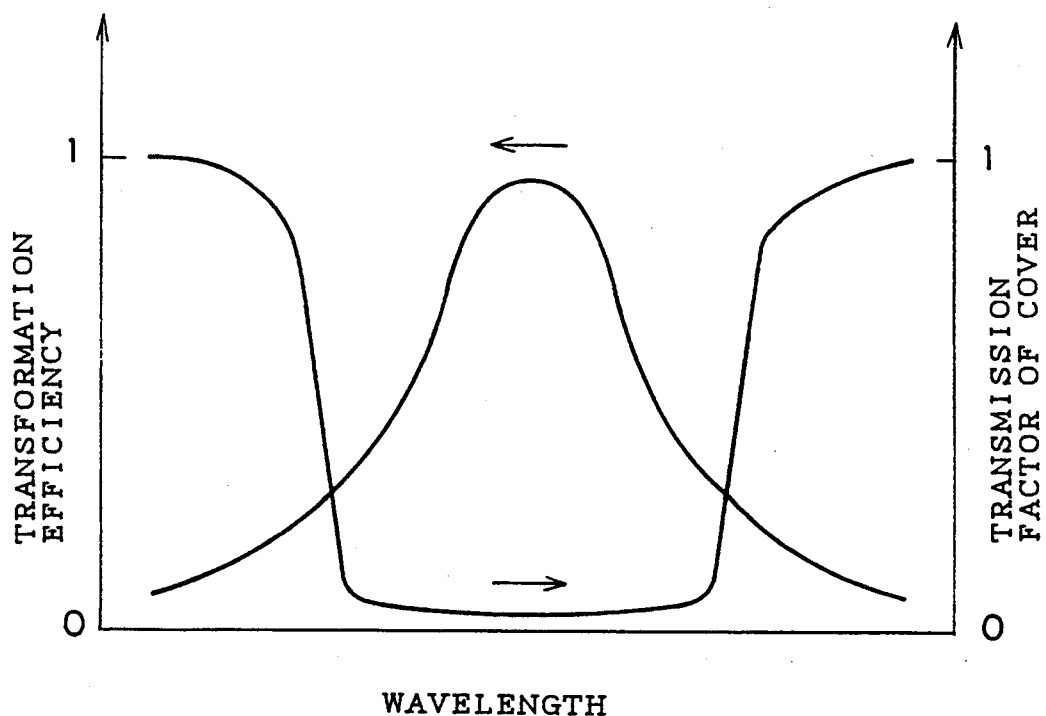
FIG. 19 is an explanatory view illustrating the operation of the embodiment 17.

FIG. 18 is a perspective view illustrating the embodiment 17 of the present invention, i.e., one embodiment according to the thirteen aspect. A description will now be given of the embodiment 17 with reference to FIG. 18. In FIG. 18, the same reference numerals are used for component parts identical with or equivalent to those in the embodiment 1 shown in FIG. 2, and descriptions thereof are omitted. In FIG. 18, reference numeral 1401 means a cover (a shielding member) around a subject 103, and the cover 1401 is provided to prevent extraneous light except light from lighting means 101 from entering the subject 103. The cover 1401 includes a material to cut all wavelengths, or a material to cut a particular wavelength as shown in FIG. 19.

A description will now be given of the operation. Light emitted from the lighting means 101 passes through an optical bundle 102 for irradiation of an entrance surface, and is reflected from the entrance surface. The reflected light forms a light pattern according to an irregular pattern of the subject 103. The reflected light having the light pattern enters each optical fiber of the optical fiber bundle 102 to be propagated through each optical fiber to reach an exit surface, and is imaged on an imaging surface of an imaging device 105. At this time, in case a finger serving as the subject is exposed to the extraneous light, the extraneous light passes through the finger to enter the optical fiber, and is propagated through each optical fiber to reach the exit surface. Consequently, there is a risk of variation in the light pattern due to the extraneous light. In the embodiment, unnecessary light such as the extraneous light can be shielded since the cover 1401 is provided around the finger. Therefore, it is possible to avoid the variation in the light pattern, and avoid reduction of contrast. That is, the thin line in FIG. 19 shows a sensitivity characteristic (a transformation efficiency) of the imaging device 105, and the thick line shows transmission factor of the cover 1401. As seen from FIG. 19, in the extraneous light, the cover removes light in a wavelength range to which the imaging device 105 is sensitive, and other extraneous light can be hardly detected even if the light enters due to low sensitivity of the imaging device to the light. As a result, the imaging device 105 can obtain only a signal from the lighting means 101.

Embodiment 18

Though the cover is provided only around the finger in the embodiment as described above, a wider range such as the subject, and lighting means may be accommodated in the cover in case the finger is directly lighted as described in the embodiment 9.

Embodiment 19

Figure 20:
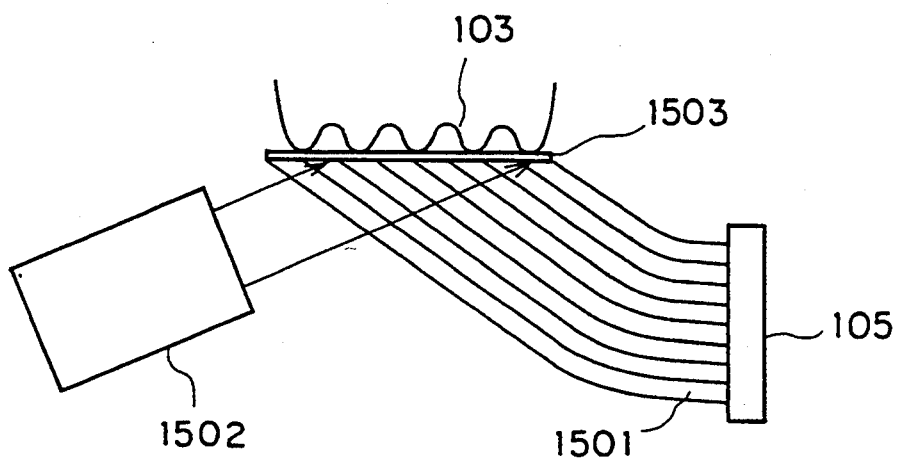
FIG. 20 is a general diagram illustrating an overall construction of an irregular pattern input device according to the embodiment 19 of the present invention.
Figure 21:
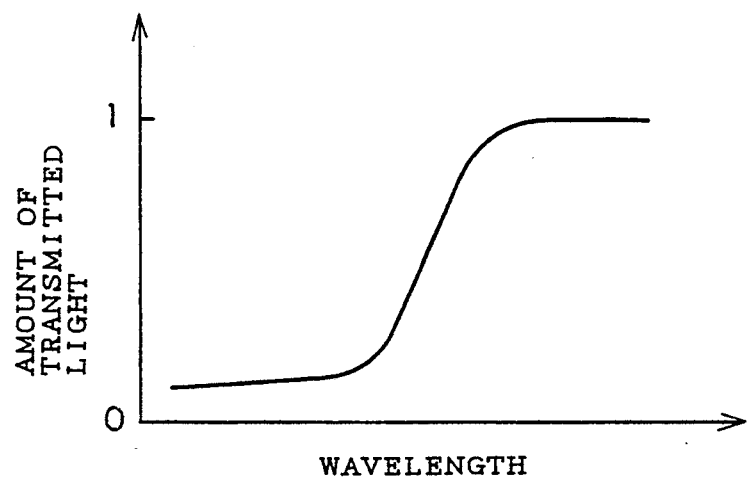
FIGS. 21(A), (B), and (C) are explanatory views illustrating the operation of the embodiment 19.
Figure 21:
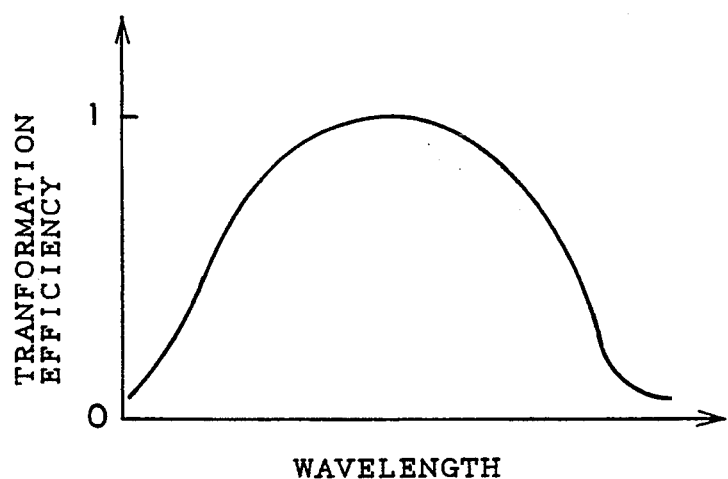
Figure 21:
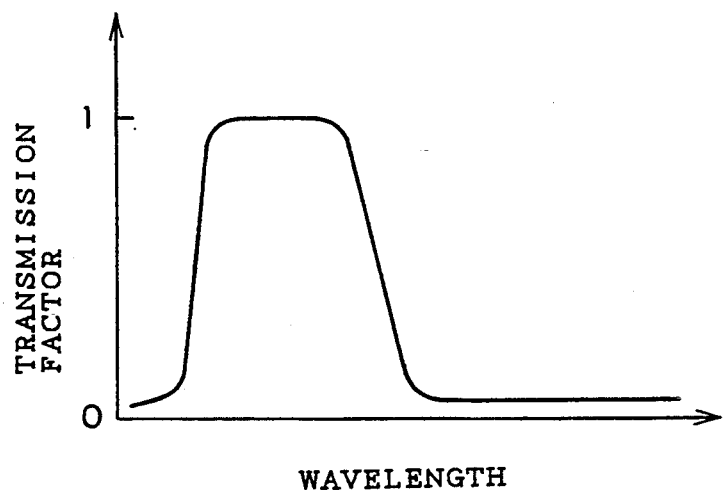

FIG. 20 is a general diagram illustrating an overall construction of the embodiment 19 of the present invention, i.e., one embodiment according to the seventh aspect. FIG. 21(A) shows a transmitted light amount characteristic of a subject such as a finger, FIG. 21(B) shows a sensitivity characteristic of an imaging device, and FIG. 21(C) shows a transmission efficiency of a filter according to the embodiment. A description will now be given of the embodiment 19 with reference to FIG. 20. In FIG. 20, the same reference numerals are used for component parts identical with or equivalent to those in the embodiment 1 shown in FIG. 2, and descriptions thereof are omitted. In FIG. 20, reference numeral 1501 means an optical fiber bundle, and 1502 means a light source having a single wavelength. Since a transmission factor is low for a short wavelength in the transmitted light characteristic of the subject 103 such as a finger as shown in, for example, FIG. 21(A), a light source having the short wavelength (of 500 to 600 nm) is employed as the light source 1502. As shown in FIG. 21(B), an imaging device 105 exhibits efficient sensitivity in a range of the short wavelength. Reference numeral 1503 means a filter which is mounted on the entrance surface of the optical fiber bundle 1501, and the filter is a band-pass filter having the transmission efficiency as shown in FIG. 21(C). That is, the band-pass filter passes only light having a wavelength in substantially the same range as that of the wavelength of the light source 1502 so as to remove light having other wavelengths, and the band-pass filter includes an optical interference film, or an absorption film.

A description will now be given of the operation. Light from the light source 1502 has the short wavelength so that the light can pass through a filter 1503 to provide a light pattern according to irregularity of the subject, and is propagated through the optical fiber bundle 1501 to be introduced from an exit surface into the imaging device 105, resulting in the imaging. On the other hand, as seen from FIG. 21(A), the extraneous light which can enter the entrance surface by passing through the finger is only extraneous light having a long wavelength. The light having high wavelength is removed by the filter 1503 so that there is little effect of the extraneous light on the imaging device. As a result, the imaging device 105 can obtain only a signal from the lighting means 1502. Therefore, it is possible to avoid variation in the light pattern due to the extraneous light, and avoid reduction of contrast as in the embodiment 17.

Embodiment 20

Figure 22A:
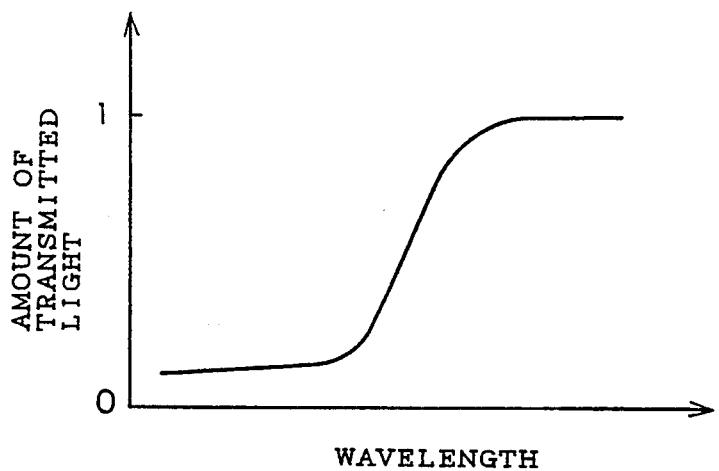
FIGS. 22(A), (B), and (C) are explanatory views illustrating the operation of the embodiment 20.
Figure 22B:
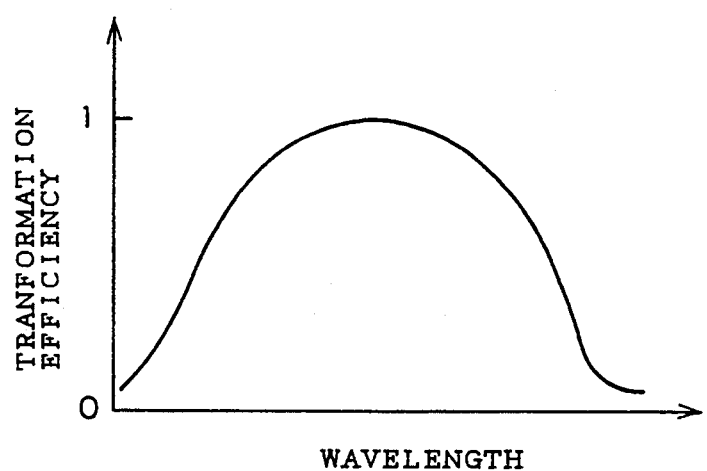
Figure 22C:
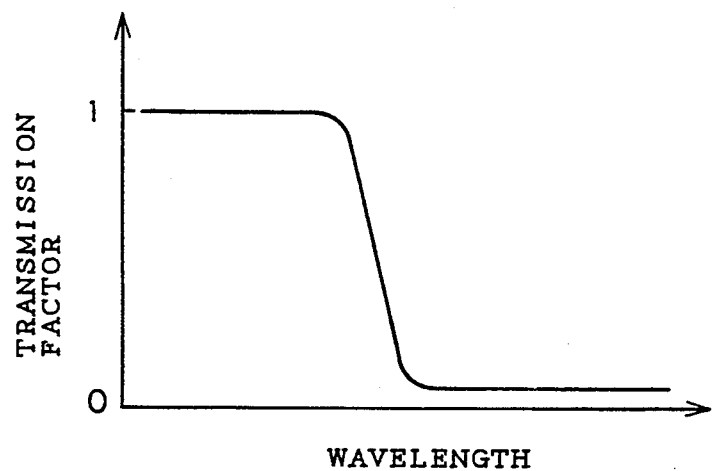

Though the band-pass filter is employed as the filter in the embodiment as described above, a low-pass filter may be employed as shown in FIG. 22(C). In this case, it is assumed that a transmitted light characteristic of a finger and a sensitivity characteristic of an imaging device are the same as the characteristics in the embodiment 19 as shown in FIGS. 22(A) and 22(B).

Embodiment 21

Figure 23:
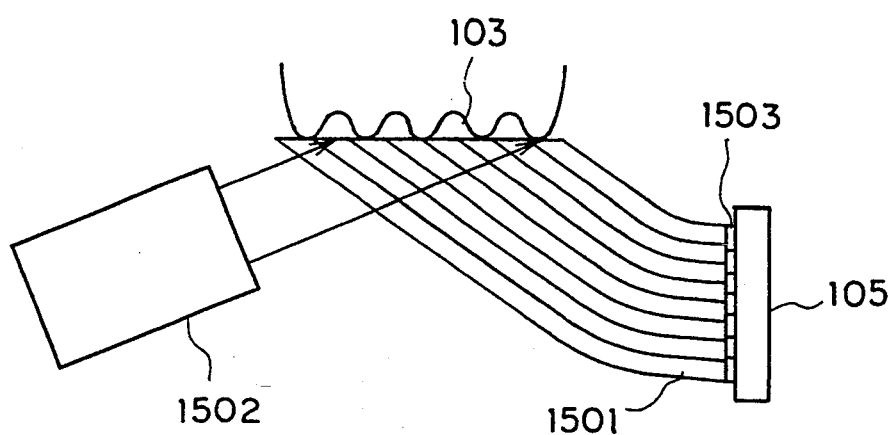
FIG. 23 is a general diagram illustrating an overall construction of an irregular pattern input device according to the embodiment 21 of the present invention.
Figure 24:
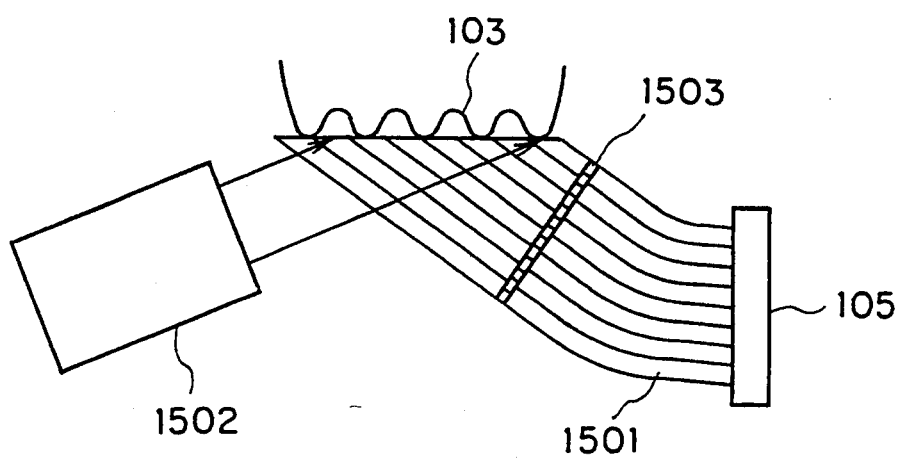
FIG. 24 is a general diagram illustrating an overall construction of the irregular pattern input device according to the embodiment 21 of the present invention.

Alternatively, though the filter is mounted on the entrance surface of the optical fiber bundle 1501 in the embodiment 18, the filter may be mounted on an exit surface as shown in FIG. 23, or may be provided on the course of an optical fiber bundle 1501 as shown in FIG. 24.

Embodiment 22

Figure 25:
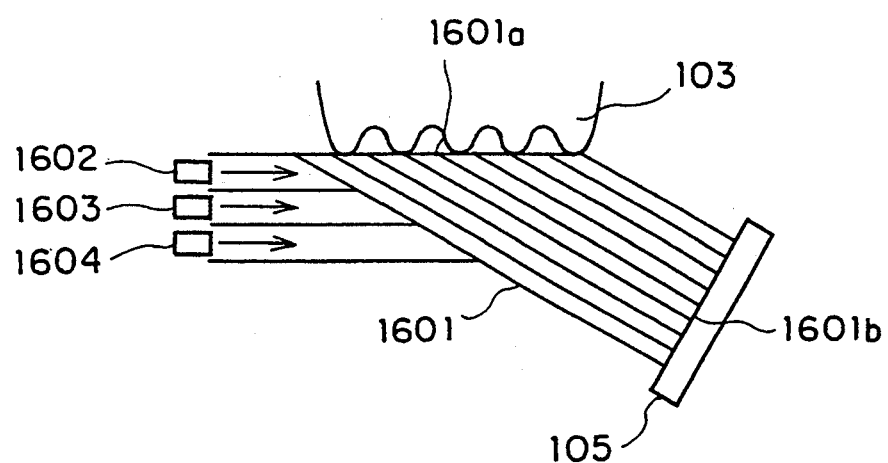
FIG. 25 is a general diagram illustrating an overall construction of an irregular pattern input device according to the embodiment 22 of the present invention.

FIG. 25 is a general diagram illustrating an overall construction of the embodiment 22 of the present invention, i.e., one embodiment according to the eighth aspect. A description will now be given of the embodiment 22 with reference to FIG. 25. In FIG. 25, the same reference numerals are used for component parts identical with or equivalent to those in the embodiment 1 shown in FIG. 2, and descriptions thereof are omitted. In FIG. 25, reference numeral 1601 means an optical fiber bundle, and 1602, 1603, and 1604 mean light sources including, for example, light emitting diodes which are arranged in an array. Intensity of irradiation light becomes higher from the light source 1602 to the light source 1604.

A description will now be given of the operation. The irradiation light emitted from the light source 1602 is reflected from the left side of an entrance surface 1601a, that is, from the entrance surface closer to the light source. The irradiation light obtains a light pattern according to irregularity of a subject, and is propagated through an optical fiber to reach an exit surface 1601b. Irradiation light emitted from the light source 1603 is reflected from a surface near an intermediate portion of the entrance surface 1601a. The irradiation light obtains the light pattern according to the irregularity of the subject, and is propagated through the optical fiber to reach the exit surface 1601b. Further, irradiation light emitted from the light source 1604 is reflected from the right side of the entrance surface 1601a, that is, from the surface farther away from the light source. The irradiation light obtains the light pattern according to the irregularity of the subject, and is propagated through the optical fiber to reach the exit surface 1601b. If the light sources 1602, 1603, and 1604 emit light having the same intensity, it is impossible to provide a uniform intensity distribution of the irradiation light at a time of reaching the entrance surface since the light emitted from the light source 1602 and the light emitted from the light source 1604 have each different distance to intersect the optical fiber. In the embodiment, the intensity of the irradiation light becomes higher from the light source 1602, to the light 1604 so as to provide the uniform intensity distribution of the irradiation light on the entrance surface. Therefore, the obtained light pattern becomes a pattern having uniform brightness, and is easy to see.

Embodiment 23

Figure 26:
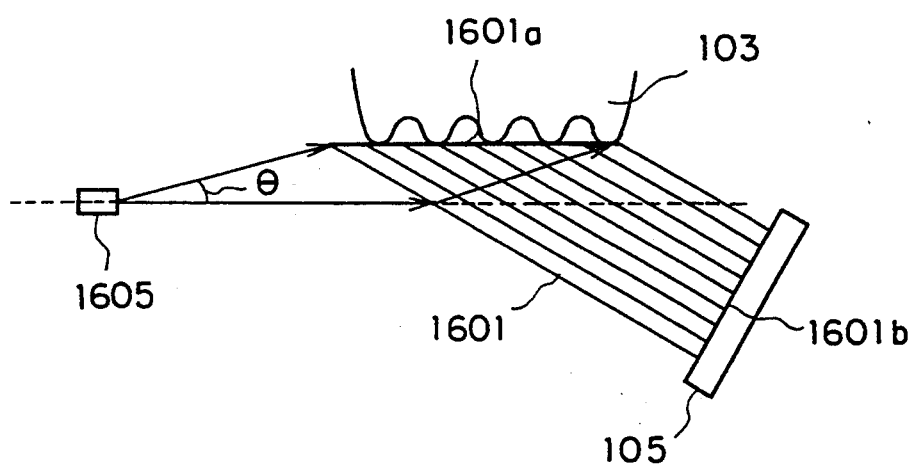
FIG. 26 is a general diagram illustrating an overall construction of an irregular pattern input device according to the embodiment 23 of the present invention.
Figure 27:
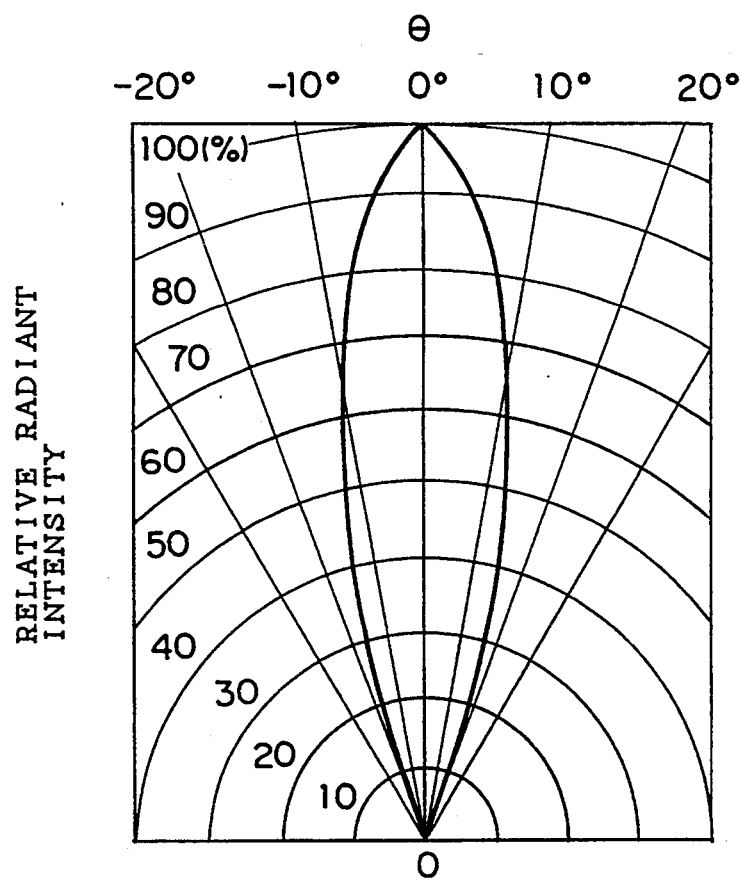
FIG. 27 is an explanatory view illustrating the operation of the embodiment 23.

Alternatively, though the array of light sources is employed in the above embodiment, a single light source (light emitting diode) 1605 may be employed as a light source as shown in FIG. 26, and a distribution of light emitted from the light source 1605 may be adjusted to provide an intensity distribution as shown in FIG. 27. In the embodiments described above, it is not particularly considered that the light emitted from the light source is refracted when the light enters an optical fiber bundle. However, in the embodiment, the intensity distribution of the light emitted from the light source is found in view of the refraction as shown in FIG. 26. In FIG. 27, light travelling in a straight line exhibits the highest intensity, and the light reaches the leftmost side of an entrance surface 1601a (i.e., a surface farther away from the light source). As a radiation angle θ becomes greater, the intensity more decreases so that the light reaches a position gradually closer to the leftmost side of the entrance surface 1601a (i.e., a surface closer to the light source). As a result, it is possible to provide uniform intensity on the entrance surface 1601a as in the embodiment 22. Therefore, the obtained light pattern becomes a pattern having uniform brightness, and is easy to see.

Embodiment 24

Figure 28A:
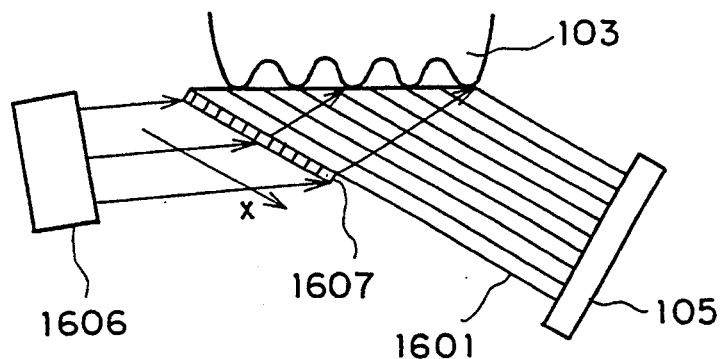
FIG. 28(A) is a general diagram illustrating an overall construction of the irregular pattern input device according to the embodiment 24 of the present invention.
Figure 28B:
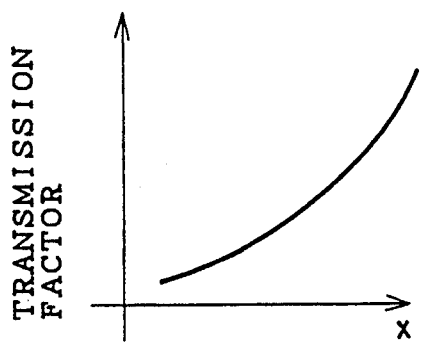
FIG. 28(B) is an explanatory view illustrating the operation of the embodiment 24.

FIGS. 28(A) and (B) show a modification in the embodiment described above. In FIG. 28(A), reference numeral 1606 means a light source having a uniform intensity distribution, and 1607 means an absorption film having a transmission factor distribution as shown in FIG. 28(B). The absorption film 1607 is mounted on a surface through which irradiation light form the light source 1606 enters an optical fiber bundle 1601. In the drawing, x means a position of the absorption film. Thereby, it is also possible to provide a uniform intensity distribution of the irradiation light on the entrance surface.

Embodiment 25

Figure 29:
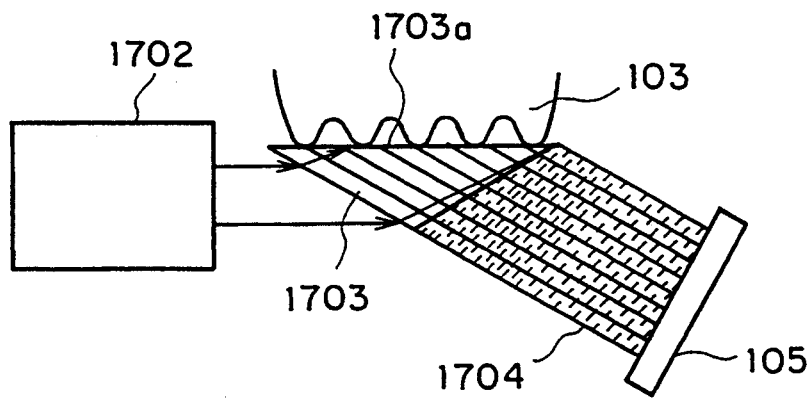
FIG. 29 is a general diagram illustrating an overall construction of an irregular pattern input device according to the embodiment 25 of the present invention.

FIG. 29 is a general diagram illustrating an overall construction according to the embodiment 25 of the present invention, i.e., one embodiment according to the ninth aspect. A description will now be given of the embodiment 25 with reference to FIG. 29. In FIG. 29, the same reference numerals are used for component parts identical with those of the embodiment 1 shown in FIG. 3, and description thereof are omitted. In FIG. 29, reference numeral 1702 means a light source, 1703 is an optical fiber bundle, 1703a is an entrance surface of the optical fiber bundle 1703, 1704 is an optical fiber bundle in which an absorption body is interposed between fibers so as to absorb light, and 1704b is an exit surface of the optical fiber bundle 1704. The absorption body absorbs light externally entering through a side surface of the fiber, or light entering from another fiber. Accordingly, only light introduced into the fiber from a particular area of an entrance surface 1703a to travel through the fiber can be propagated to an exit surface 1704b. As a result, it is possible to avoid variation in a light pattern obtained on the entrance surface 1703a.

Figure 30:
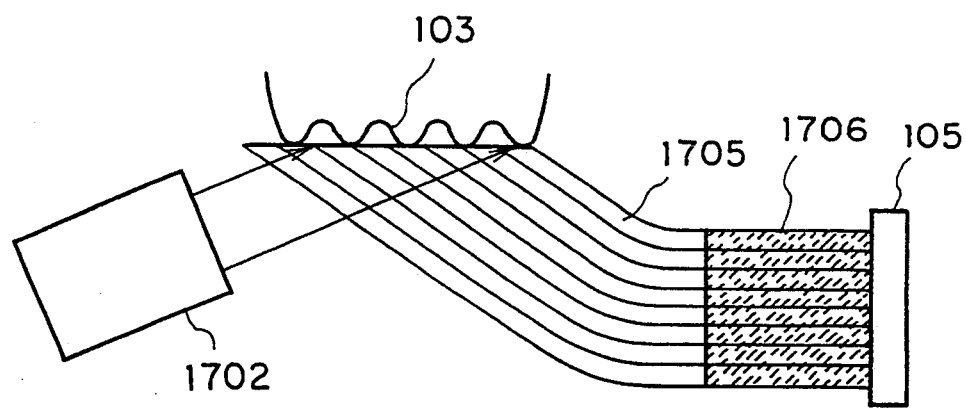
FIG. 30 is a general diagram illustrating an overall construction of the irregular pattern input device according to the embodiment 25 of the present invention.

Alternatively, as shown in FIG. 30, a rectangular parallelopiped portion 1706 of the optical fiber bundle may be provided with the absorption body, and no absorption body may be provided for the other portion 1705 of the optical fiber bundle. In FIG. 30, reference numeral 1702 means a light source.

Embodiment 26

Figure 31:
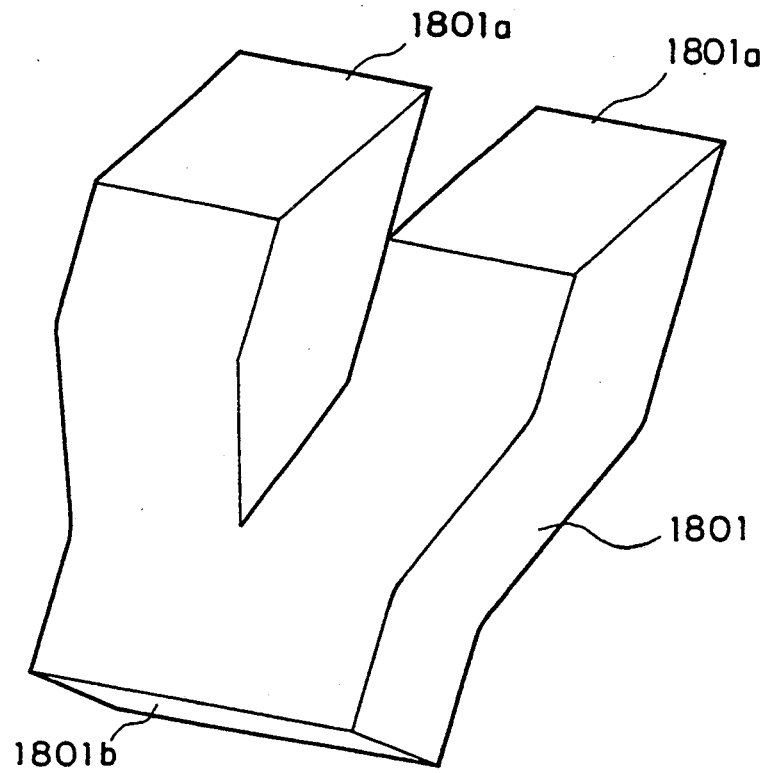
FIG. 31 is a perspective view illustrating a partial construction of an irregular pattern input device according to the embodiment 26 of the present invention.

FIG. 31 is a perspective view illustrating a construction of an optical fiber according to the embodiment 26 of the present invention, i.e., one embodiment according to the tenth aspect. A description will now be given of the embodiment 26 with reference to FIG. 31. In FIG. 31, reference numeral 1801 means an optical fiber bundle, and the optical fiber bundle 1801 includes two separated entrance surfaces 1801a, and one exit surface 1801b.

A description will now be given of the operation. Two subjects are mounted on the respective entrance surfaces 1801a to obtain each light pattern according to each irregularity. Subsequently, each light pattern is propagated through the optical fiber bundle 1801, and exits as two separated patterns from the one exit surface 1801b. The exiting patterns are processed in an imaging device at one time, or separately processed for each pattern as in the case of the patterns as described above. As set forth above, it is possible to detect a plurality of subjects (two subjects in this case) by a single imaging device, and reduce the number of parts of a device by using the above optical fiber bundle 1801.

Embodiment 27

Figure 32:
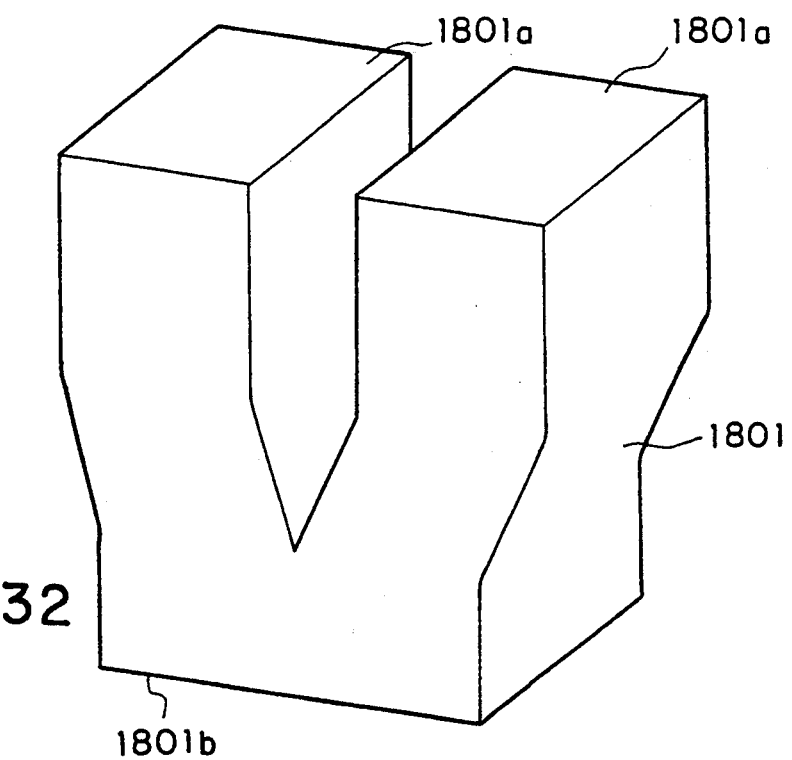
FIG. 32 is a perspective view illustrating a partial construction of an irregular pattern input device according to the embodiment 27 of the present invention.

Though the entrance surface of the optical fiber bundle is diagonally cut away in FIG. 31, it is to be noted that the present invention may be applied to an entrance surface which is vertically cut away, or a device to directly light a subject as shown in FIG. 32.

Embodiment 28

Figure 34:
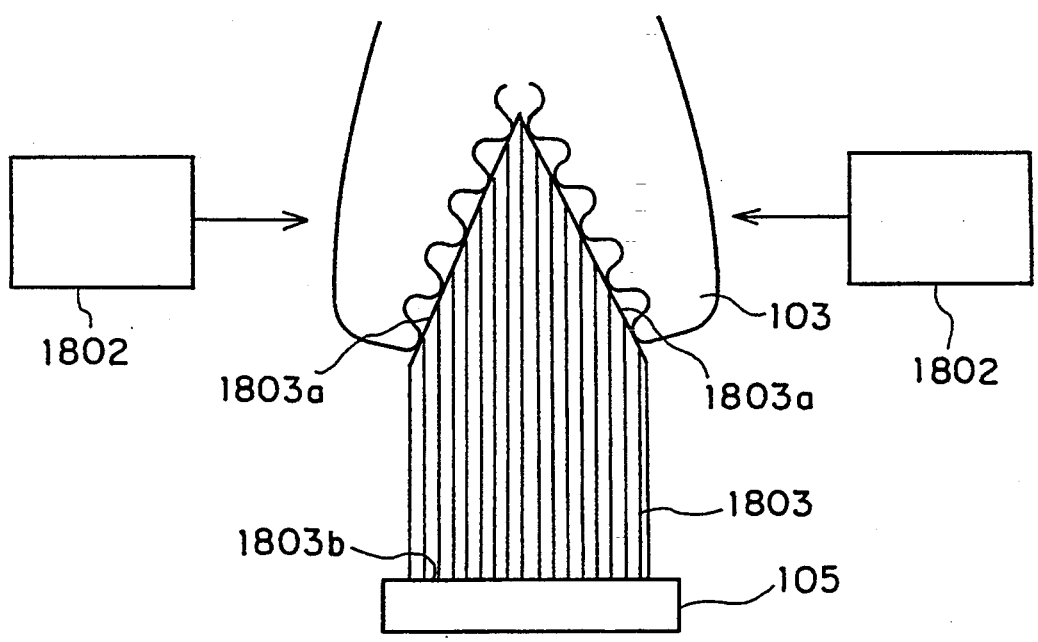
FIG. 34 is a general diagram illustrating an overall construction of the irregular pattern input device according to the embodiment 28 of the present invention.
Figure 33:
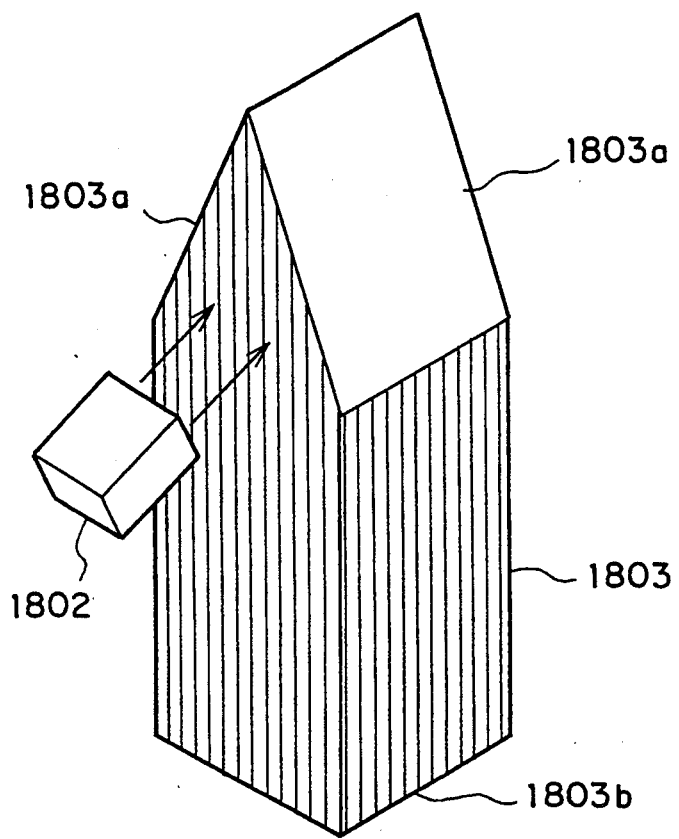
FIG. 33 is a perspective view illustrating a partial construction of an irregular pattern input device according to the embodiment 28 of the present invention.

Alternatively, as shown in FIGS. 33 and 34, a plurality of planes (two planes in this case) may be provided at one end of an optical fiber bundle 1803 to form a plurality of entrance surfaces 1803a, and the other end may be provided in a single plane form to serve as an exit surface 1803b, resulting in the same effect as that in the embodiment 26.

FIG. 33 shows a modification utilizing the diffuse reflection as described in the embodiment 6, and FIG. 34 shows another modification in which the subject is directly lighted as described in the embodiment 9.

According to the first aspect of the present invention, the half mirror is disposed between the exit surface and the photoelectric transforming means so that the return optical system can be provided to have the lighting means coaxial with the optical transforming means. As a result, it is possible to provide a more compact irregular pattern input device.

According to the second aspect of the present invention, the entrance surface of the optical fiber bundle is inclined by the predetermined angle with respect to the axis, and the irradiation light is not totally reflected from the entrance surface in contact with the convex portion of the subject, and is totally reflected from the entrance surface in no contact with the concave portion. As a result, it is possible to provide a high contrast light pattern.

According to the third aspect of the present invention, the entrance surface of the optical fiber bundle is inclined by the predetermined angle with respect to the axis. Further, each light regularly reflected from the entrance surface in contact with the convex portion of the subject and from the entrance surface in no contact with the concave portion is prevented from being propagated to the exit surface, and there is generated the different scattering angles of light at the respective entrance surfaces. As a result, it is possible to provide a high contrast light pattern. In addition, restriction on the irradiation direction by the lighting means can be reduced to enhance the degree of freedom in a configuration of an optical system.

According to the fourth aspect of the present invention, the irradiation light is directly emitted to the subject without passing through the optical fiber. Further, there is generated a difference between scattering angles of light at the entrance surface in contact with the convex portion of the subject and at the entrance surface in no contact with the concave portion as in the third aspect. As a result, it is possible to provide a high contrast light pattern.

According to the fifth aspect of the present invention, the lighting means includes the light waveguide mounted on the entrance surface of the optical fiber bundle, and the light source to introduce the light into the light waveguide in order to propagate the light through the waveguide so as to emit the irradiation light to the subject mounted on the waveguide path, resulting in the light pattern according to the convex portion and the concave portion of the subject. As a result, it is possible to optionally set the optical path by using the optical fiber, resulting in a compact device. Further, the light waveguide is employed so that there is no restriction on an irradiation direction of the irradiation light.

According to the sixth aspect of the present invention, the shielding member is disposed around the subject, or around the subject and the lighting means. Therefore, it is possible to remove variation in the light pattern due to the disturbance, and prevent reduction of the contrast.

According to the seventh aspect of the present invention, the irradiation light has the wavelength in the particular range, and the filter is interposed between the entrance surface of the optical fiber bundle and the photoelectric transforming means to pass only the light having the wavelength in the particular range. Therefore, unnecessary light except the irradiation light never enters the photoelectric transforming means so that reduction of the contrast can be avoided.

According to the eighth aspect of the present invention, there is means for providing the uniform intensity distribution of the irradiation light on the entrance surface of the optical fiber bundle. Therefore, the obtained light pattern has uniform brightness, and is easy to see.

According to the ninth aspect of the present invention, the material to absorb light is interposed between the bundled optical fibers at least in one portion of the optical fiber bundle other than the partial optical fiber bundle through which the irradiation light emitted by the lighting means passes before reaching the entrance surface of the optical fiber bundle. Therefore, it is possible to propagate only waveguide light of the particular optical fiber through the fiber. As a result, no light pattern is varied so that reduction of the contrast can be avoided.

According to the tenth aspect of the present invention, the optical fiber bundle includes the plurality of separated entrance surfaces, and one exit surface. As a result, it is possible to image the plurality of subjects by one imaging device, and reduce the number of parts.

While preferred embodiments of the invention have been described using specific terms, such description is for illustrative purposes only, and it is to be understood that changes and variations may be made without departing from the spirit or scope of the following claims.

What is claimed is:

1. An irregular pattern input device comprising:
    an optical fiber bundle formed by bundling a plurality of optical fibers to have an entrance surface and an exit surface formed at both ends of said bundled optical fibers;
    lighting means for emitting irradiation light to said entrance surface so as to provide a light pattern having each different amount of reflected light at said entrance surface in contact with a convex portion of a subject and at said entrance surface in no contact with a concave portion of said subject; and
    photoelectric transforming means, into which said obtained light pattern is inputted through said exit surface of said optical fiber bundle, for transforming said inputted light pattern into electric information,
    wherein a half mirror is provided on the side of said exit surface of an optical fiber bundle, and irradiation light emitted from said lighting means being reflected from said half mirror to be introduced into said entrance surface through said exit surface, and passing through said half mirror to be input into photoelectric transforming means.

2. An irregular pattern input device according to claim 1, wherein a shielding member is disposed around said subject, or around said subject and lighting means.

3. An irregular pattern input device according to claim 1, wherein irradiation light emitted from said lighting means has a wavelength in a particular range, and a filter being interposed between said entrance surface of said optical fiber bundle and photoelectric transforming means to pass only light having said wavelength in said particular range.

4. An irregular pattern input device according to claim 1, wherein said lighting means includes equalizing means for providing a uniform intensity distribution of irradiation light on said entrance surface of said optical fiber bundle.

5. An irregular pattern input device according to claim 1, wherein said optical fiber bundle includes a
    plurality of separated entrance surfaces, and one exit surface.

6. An irregular pattern input device comprising:
    an optical fiber bundle formed by bundling a plurality of optical fibers to have an entrance surface and an exit surface formed at both ends of said bundled optical fibers;
    lighting means for emitting irradiation light to said entrance surface so as to provide a light pattern having each different amount of reflected light at said entrance surface in contact with a convex portion of a subject and at said entrance surface in no contact with a concave portion of said subject; and
    photoelectric transforming means, into which said obtained light pattern is inputted through said exit surface of said optical fiber bundle, for transforming said inputted light pattern into electric information,
    wherein an entrance surface of an optical fiber bundle is inclined by a predetermined angle with respect to an axis of an optical fiber, and lighting means emitting irradiation light to enter said entrance surface at an angle of incidence larger than a critical angle on an interface between said optical fiber and air so as to provide a light pattern which is not totally reflected from said entrance surface in contact with a convex portion of a subject, and is totally reflected from said entrance surface in no contact with a concave portion of said subject, and emitting irradiation light having an angle of incidence which meets a constant relation with respect to a tilt angle of said entrance surface of said optical fiber bundle such that said light pattern is propagated through said optical fiber bundle to said exit surface.

7. An irregular pattern input device according to claim 6, wherein a shielding member is disposed around said subject, or around said subject and said lighting means.

8. An irregular pattern input device according to claim 6, wherein irradiation light emitted from said lighting means has a wavelength in a particular range, and a filter being interposed between said entrance surface of said optical fiber bundle and photoelectric transforming means to pass only light having said wavelength in said particular range.

9. An irregular pattern input device according to claim 6, wherein said lighting means includes equalizing means for providing a uniform intensity distribution of irradiation light on said entrance surface of said optical fiber bundle.

10. An irregular pattern input device according to claim 6, wherein a material to absorb light is interposed between bundled optical fibers at least in one portion of said optical fiber bundle other than a partial optical fiber bundle through which irradiation light emitted by lighting means passes before reaching an entrance surface of said optical fiber bundle.

11. An irregular pattern input device according to claim 6, wherein said optical fiber bundle includes a plurality of separated entrance surfaces, and one exit surface.

12. An irregular pattern input device comprising:
an optical fiber bundle formed by bundling a plurality of optical fibers to have an entrance surface and an exit surface formed at both ends of said bundled optical fibers;
lighting means for emitting irradiation light to said entrance surface so as to provide a light pattern having each different amount of reflected light at said entrance surface in contact with a convex portion of a subject and at said entrance surface in no contact with a concave portion of said subject; and
photoelectric transforming means, into which said obtained light pattern is inputted through said exit surface of said optical fiber bundle, for transforming said inputted light pattern into electric information,
wherein an entrance surface of an optical fiber bundle is inclined by a predetermined angle with respect to an axis of an optical fiber, and said lighting means emitting irradiation light at an angle of incidence which meets a constant relation with respect to a tilt angle of said entrance surface of said optical fiber bundle in order to prevent light regularly reflected from said entrance surface in contact with a convex portion of a subject from being propagated to an exit surface and to propagate diffuse reflection light to said exit surface, and in order to prevent light regularly reflected from said entrance surface in no contact with a concave portion of said subject, or light entering said entrance surface from said concave portion through air from being propagated to said exit surface so as to obtain a light pattern according to irregularity of said subject.

13. An irregular pattern input device according to claim 12, wherein a shielding member is disposed around said subject, or around said subject and said lighting means.

14. An irregular pattern input device according to claim 12, wherein irradiation light emitted from said lighting means has a wavelength in a particular range, and a filter being interposed between said entrance surface of said optical fiber bundle and photoelectric transforming means to pass only light having said wavelength in said particular range.

15. An irregular pattern input device according to claim 12, wherein said lighting means includes equalizing means for providing a uniform intensity distribution of irradiation light on said entrance surface of said optical fiber bundle.

16. An irregular pattern input device according to claim 12, wherein a material to absorb light: is interposed between bundled optical fibers at least in one portion of said optical fiber bundle other than a partial optical fiber bundle through which irradiation light emitted by lighting means passes before reaching an entrance surface of said optical fiber bundle.

17. An irregular pattern input device according to claim 12, wherein said optical fiber bundle includes a plurality of separated entrance surfaces, and one exit surface.

18. An irregular pattern input device comprising:
an optical fiber bundle formed by bundling a plurality of optical fibers to have an entrance surface and an exit surface formed at both ends of said bundled optical fibers;
lighting means for emitting irradiation light to said entrance surface so as to provide a light pattern having each different amount of reflected light at said entrance surface in contact with a convex portion of a subject and at said entrance surface in no contact with a concave portion of said subject; and
photoelectric transforming means, into which said obtained light pattern is inputted through said exit surface of said optical fiber bundle, for transforming said inputted light pattern into electric information,
wherein an entrance surface of an optical fiber bundle is inclined by a predetermined angle with respect to an axis of said optical fiber, and said lighting means being set such that a constant relation can be satisfied between a critical angle on an interface between said optical fiber and air and a tilt angle of said entrance surface so as to provide a light pattern according to irregularity of said subject by propagating diffused light of said irradiation light entering said entrance surface in contact with a convex portion of said subject through said convex portion thereof to an exit surface, and preventing diffused light of said irradiation light entering said entrance surface in no contact with a concave portion of said subject through said concave portion thereof and the air from being propagated to said exit surface.

19. An irregular pattern input device according to claim 18, wherein a shielding member is disposed around said subject, or around said subject and lighting means.

20. An irregular pattern input device according to claim 18, wherein irradiation light emitted from said lighting means has a wavelength in a particular range, and a filter being interposed between said entrance surface of said optical fiber bundle and photoelectric transforming means to pass only light having said wavelength in said particular range.

21. An irregular pattern input device according to claim 18, wherein said optical fiber bundle includes a plurality of separated entrance surfaces, and one exit surface.

22. An irregular pattern input device comprising:
an optical fiber bundle formed by bundling a plurality of optical fibers, and including an entrance surface and an exit surface formed at both ends of said optical fiber bundle;
lighting means including a light waveguide mounted on said entrance surface of said optical fiber bundle and a light source to introduce light into said light waveguide for propagating said light through said waveguide so as to emit irradiation light to a subject mounted on a waveguide path; and
photoelectric transforming means into which a light pattern according to a convex portion and a concave portion of said subject provided by said lighting means is inputted through said exit surface of said optical fiber bundle, for transforming said input light pattern into electric information.

23. An irregular pattern input device according to claim 22, wherein a shielding member is disposed around said subject, or around said subject and lighting means.

24. An irregular pattern input device according to claim 22, wherein irradiation light emitted from said lighting means has a wavelength in a particular range, and a filter being interposed between said entrance surface of said optical fiber bundle and photoelectric transforming means to pass only light having said wavelength in said particular range.

25. An irregular pattern input device according to claims 22, wherein said optical fiber bundle includes a plurality of separated entrance surfaces, and one exit surface.

* * * * *